(12) United States Patent
Kingham

(10) Patent No.: US 6,286,894 B1
(45) Date of Patent: Sep. 11, 2001

(54) REDUCED-DRAG TRAILER

(76) Inventor: D. James Kingham, P.O. Box 163, R.R. #2, Kettleby, Ontario (CA), LOG-1J0

( * ) Notice: Subject to any disclaimer, the term of this patent is extended or adjusted under 35 U.S.C. 154(b) by 0 days.

(21) Appl. No.: 09/371,965

(22) Filed: Aug. 10, 1999

(51) Int. Cl.⁷ ....................................................... B60J 7/00
(52) U.S. Cl. .................. 296/181; 296/180.4; 296/180.5; 296/180.1; 105/1.1; 105/1.3
(58) Field of Search ............................. 296/180.4, 180.5, 296/180.1, 181; 105/1.1, 1.3

(56) References Cited

U.S. PATENT DOCUMENTS

| | | | |
|---|---|---|---|
| 2,737,411 | * 3/1956 | Potter | 296/180.4 |
| 3,861,735 | * 1/1975 | Taylor | 296/1 |
| 4,142,755 | * 3/1979 | Keedy | 296/180.4 |
| 4,236,745 | * 12/1980 | Davis | 296/180.4 |
| 4,257,641 | * 3/1981 | Keddy | 296/180.4 |
| 4,269,444 | 5/1981 | Emory . | |
| 4,433,865 | * 2/1984 | Crompton | 296/180.4 |
| 4,451,074 | * 5/1984 | Scanlon | 296/180.4 |
| 4,458,936 | * 7/1984 | Mulholland | 296/180.4 |
| 4,508,380 | * 4/1985 | Sankrithi | 296/180.4 |
| 4,741,569 | * 5/1988 | Sutphen | 296/180.4 |
| 4,818,015 | * 4/1989 | Scanlon | 296/180.4 |
| 4,978,162 | * 12/1990 | Labbe | 296/180.4 |
| 5,058,945 | * 10/1991 | Elliott, Sr. et al. | 296/180.4 |
| 5,108,145 | 4/1992 | Harris . | |
| 5,289,997 | 3/1994 | Harris . | |
| 5,332,280 | * 7/1994 | DuPont | 296/180.4 |
| 5,348,366 | * 9/1994 | Baker et al. | 296/180.4 |
| 5,498,059 | * 3/1996 | Switlik | 296/180.4 |
| 5,782,521 | 7/1998 | Anderson . | |
| 6,092,861 | * 7/2000 | Whelan | 296/180.4 |

* cited by examiner

Primary Examiner—Joseph D. Pape
Assistant Examiner—Kiran B. Patel
(74) Attorney, Agent, or Firm—McDermott, Will & Emery

(57) ABSTRACT

A transportable hauling container, such as a trailer of a tractor-trailer combination, has a rear portion that is configured in or convertible to a wedge shape. Movable portions are located at the rear sides of the trailer that can pivot inward toward a longitudinal centerline. Movable flaps also are located at the rear top of the trailer, which can pivot downward in alignment with the movable portions. The movable portions and flaps can be secured relative to each other in various combinations, thereby providing a more aerodynamic configuration of the trailer rear end. The container or trailer can be configured in such an arrangement, or be convertible from a standard configuration which also includes doors at the rear of the trailer, to a more aerodynamic configuration. A method is also disclosed, which includes operations for converting such a convertible trailer between the standard and aerodynamic configurations.

18 Claims, 18 Drawing Sheets

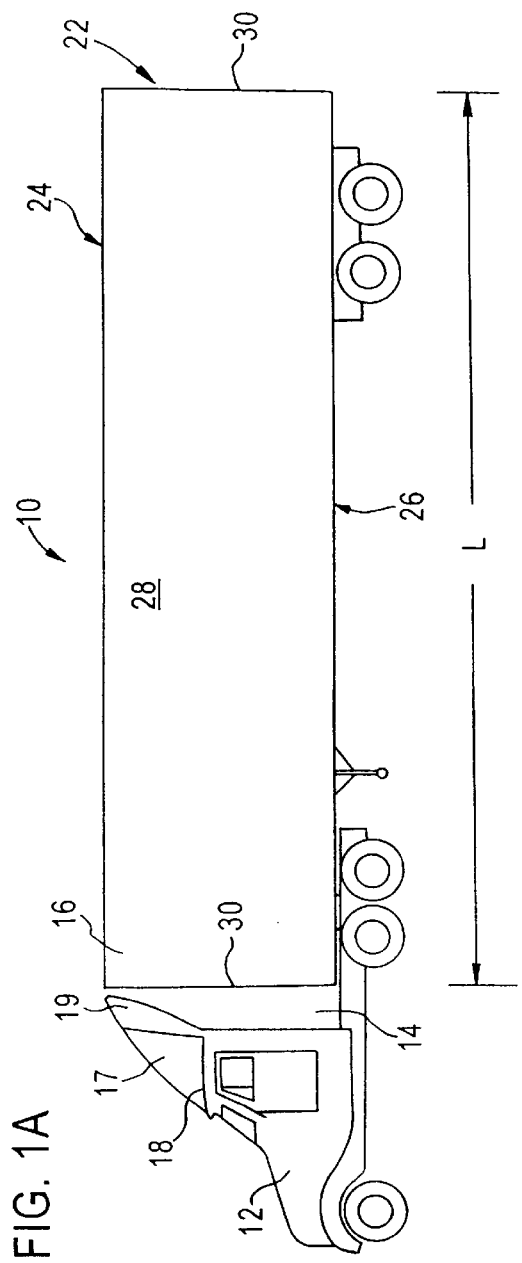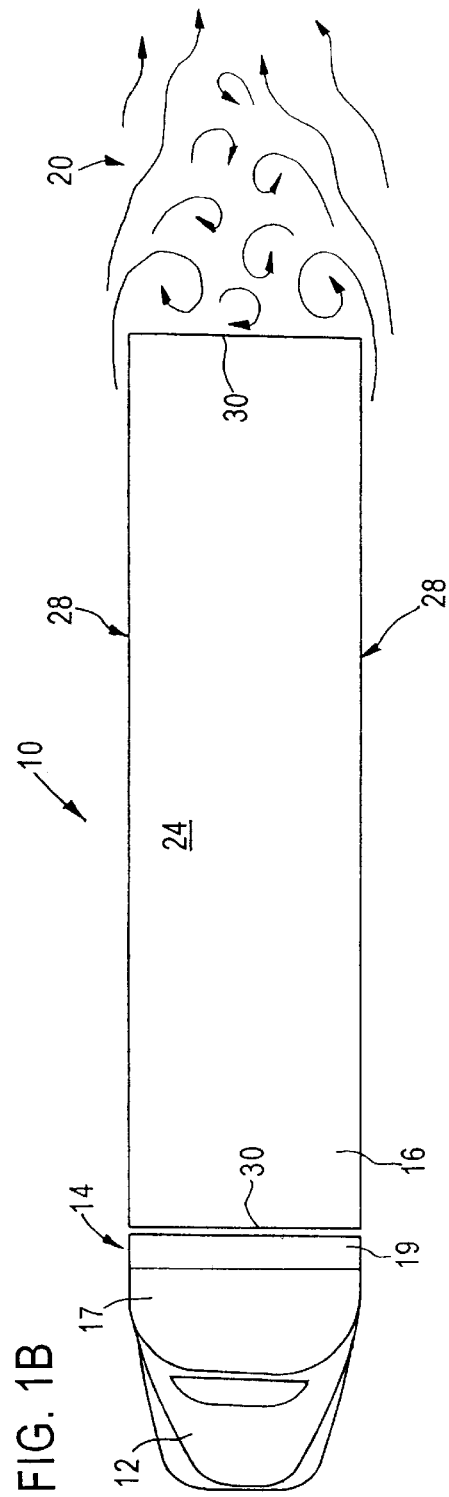

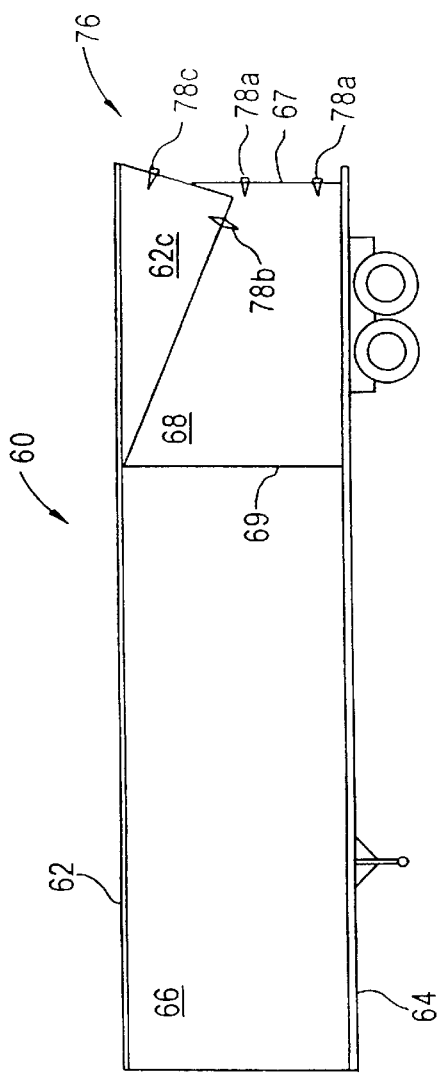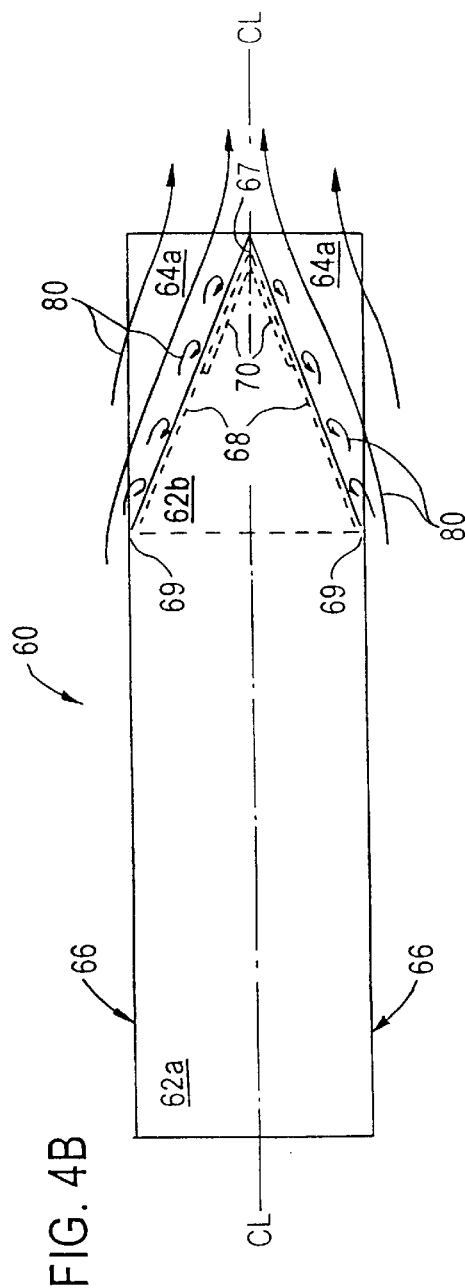
FIG. 4A
FIG. 4B

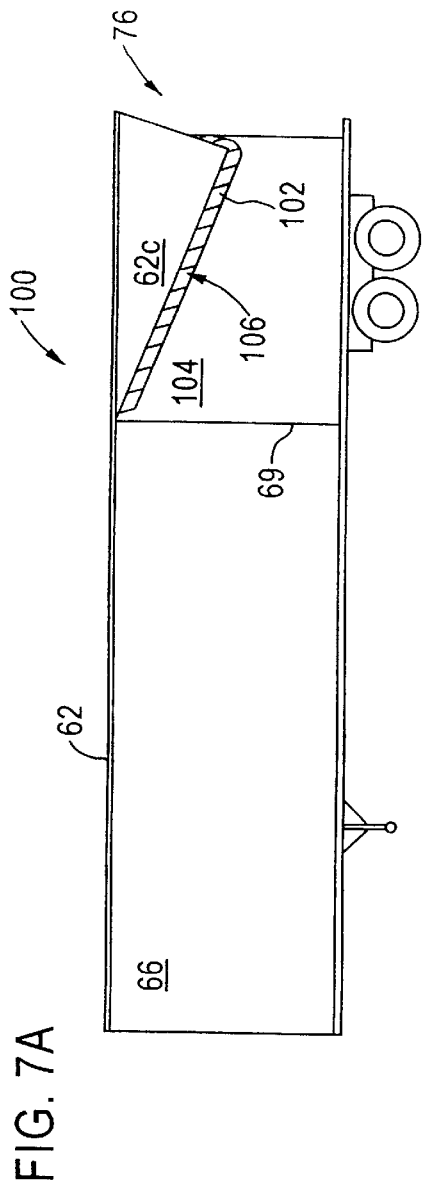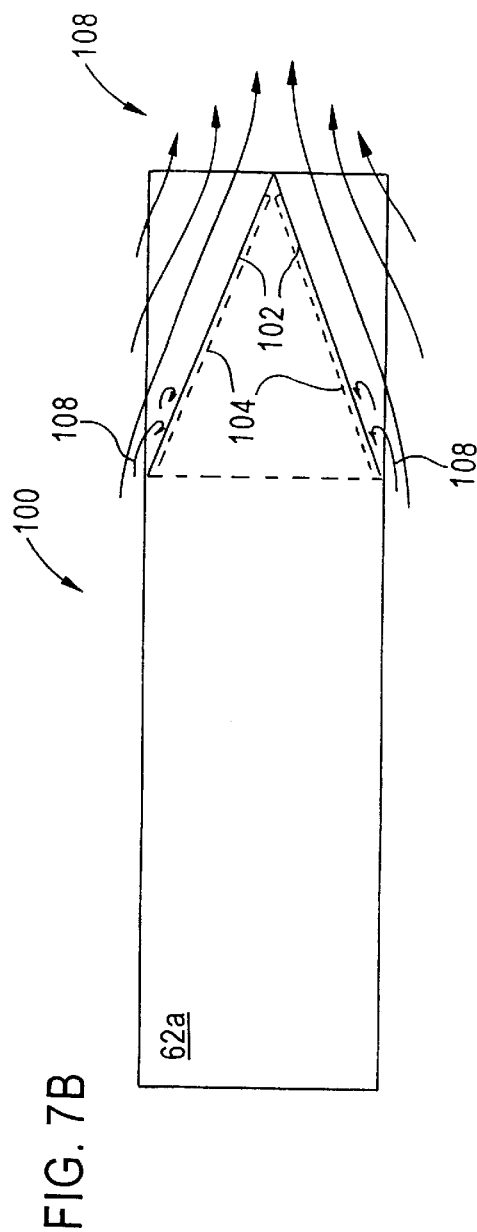

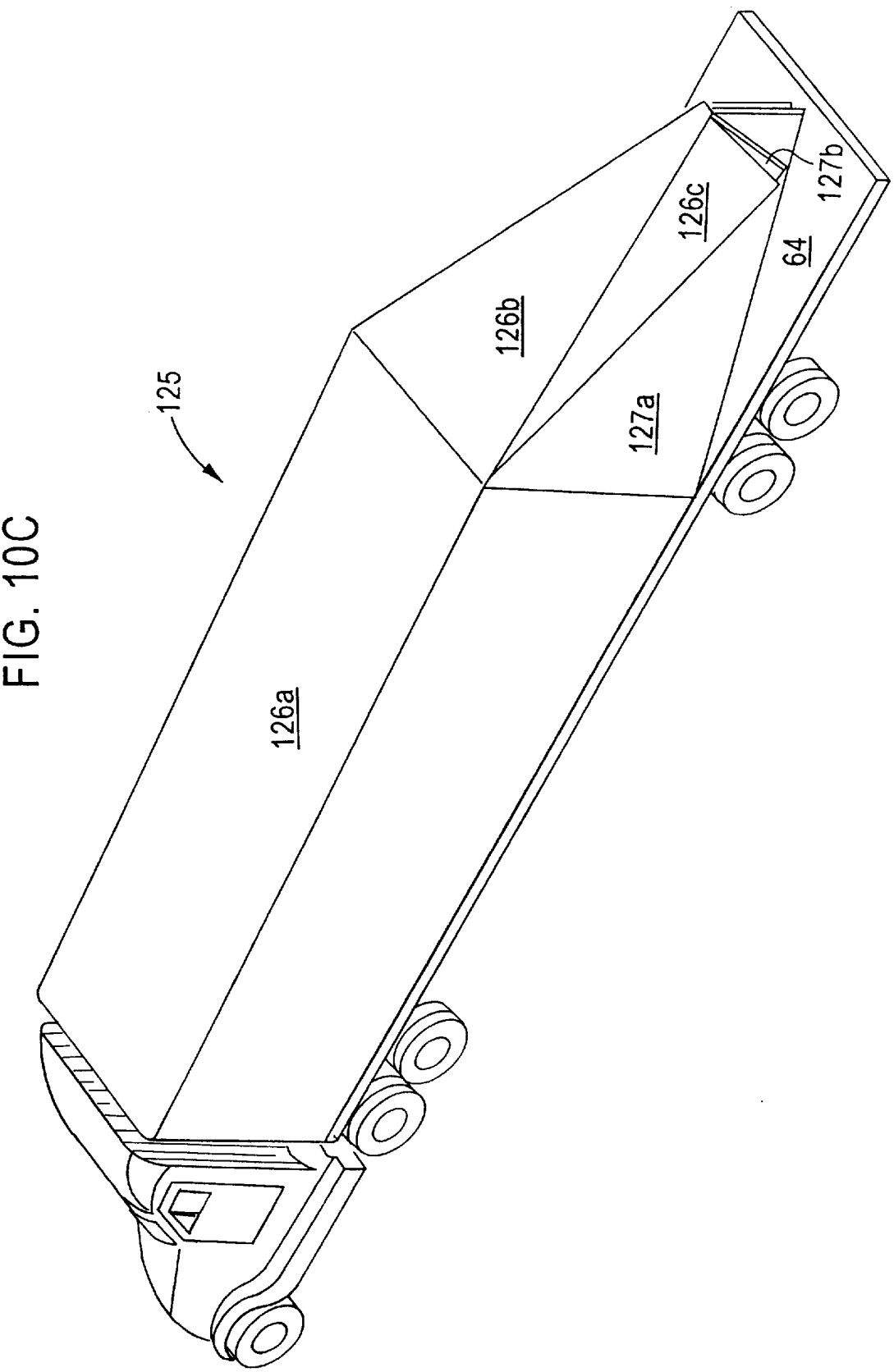

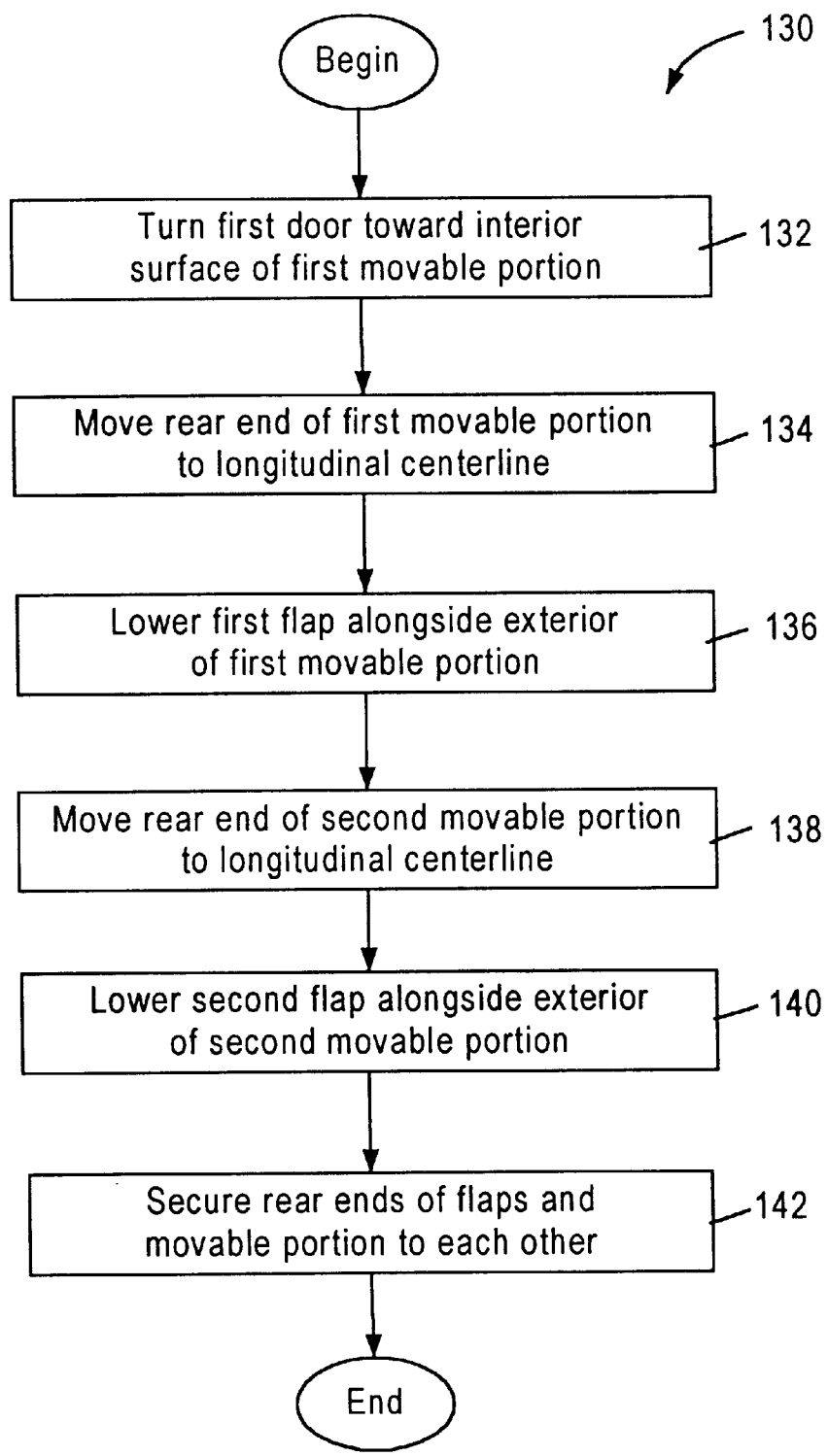

REDUCED-DRAG TRAILER

BACKGROUND OF THE INVENTION

This invention relates to a trailer that can experience significantly less drag than a conventional trailer. This invention also relates to a trailer that can be converted from one form to another and more particularly to a trailer that may be easily converted to a much more aerodynamic form, including when empty or partially empty.

As is well known in the art of vehicle design, energy consumption of a vehicle associated with its movement is directly related to certain aerodynamic characteristics of the vehicle, along with inertia, mechanical friction and rolling friction. For example, as the aerodynamic drag (hereinafter referred to as "drag") experienced by a vehicle increases, the fuel costs also correspondingly increase. The experienced drag itself is directly related to an aerodynamic characteristic of the vehicle, sometimes referred to as the drag coefficient Cd of the vehicle. Various components of a vehicle, including any carried structures that are exposed to the elements, can have component drag coefficients Cd themselves, which combine to form an overall vehicle drag coefficient Cd.

Improvements in the aerodynamics of motor vehicles have been made over the last few decades. For passenger vehicles the drag coefficient Cd has been significantly reduced. Attempts have also been made to reduce the drag coefficient Cd of tractor-trailer transport systems 10, an example of which is shown in FIGS. 1A and 1B in side and top view, respectively. Mostly, such modifications have been directed to the tractor or cab 12, and to the open space 14 between the cab 12 and the trailer 16. For example, modifications have been directed to the shape of the cab 12 itself, cowls 17 attached to the cab roof 18, and cowls 19 positioned over the open space 14 between the cab 12 and the trailer 16.

Turbulent flow, represented by the arrows 20 in FIG. 1B, at the rear 22 of the trailer, can be a significant component of tractor-trailer drag. The generation of such flow is contributed to by the shape of a conventional trailer 16, which is essentially a rectangular box having a flat, rectangular roof 24 and matching floor 26, along with flat, rectangular side panels 28. The front and rear surfaces 30 of such trailers are also generally flat rectangular surfaces.

Unfortunately, attempts to make the trailer shape more aerodynamic within the overall length L of the trailer have been accompanied by reduced carrying capacity and interference during loading of the trailer. Also, attempts to make the rear 22 of the trailer more aerodynamic, for example by the addition of panels or inflatable bladders (not shown), can suffer from disadvantages such as added weight and a significant lengthening of the trailer, with associated reductions in fuel efficiency and more difficult handling characteristics.

Therefore, it is desired to have a low cost, strong, lightweight aerodynamic trailer that can have a reduced drag coefficient and therefore reduced fuel costs. In addition, it is desired to have a reduced-drag trailer which does not reduce the potential full load capacity of the tractor-trailer and may be readily converted by one person from a full-load non-aerodynamic form to a partial-load or empty aerodynamic form, thus again facilitating reduced fuel costs.

SUMMARY OF THE INVENTION

The present invention provides a trailer having an aerodynamic shape that results in reduced drag experienced by the trailer. In addition, the present invention provides a trailer that is easily convertible from a conventional configuration to a more aerodynamic configuration. Furthermore, the present invention includes a method for converting between such trailer configurations.

In an embodiment of the present invention, a transportable hauling container includes a first wall having a first end and having two edges that culminate at a same terminus at the first end, and a second wall that opposes the first wall. The container also includes a third wall extending between the first and second wall and a fourth wall extending between the first and second wall and opposing the third wall. In addition, the container includes a first movable portion pivotally connected at a first junction to the third wall, wherein the first movable portion is located proximate the first end and is configured to be movable relative to the third wall.

In another embodiment of the present invention, a transportable hauling container includes a first wall having a first end and having two edges that culminate at a same terminus at the first end, and a second wall that opposes the first wall. The container also includes a third wall extending between the first and second wall and a fourth wall extending between the first and second wall and opposing the third wall. In addition, the container includes a first movable portion pivotally connected at a first junction to the third wall, wherein the first movable portion is located proximate the first end and is configured to be movable relative to the third wall. The container further includes a second movable portion pivotally connected at a second junction to the fourth wall, wherein the second movable portion is located proximate the first end and is configured to be movable relative to the fourth wall. At least one latching means is also included for substantially fixing a position of at least one of the first movable portion and second movable portion relative to at least one of the third wall and the fourth wall, respectively. The container additionally includes at least one flap pivotally connected to the first wall near the first end, wherein the at least one flap is movable relative to the first wall, and includes at least one latching means for substantially securing the at least one flap in a desired position relative to the first wall.

In yet another embodiment of the present invention, a transportable hauling container includes a first wall, a second wall opposing the first wall, a third wall connected to the first wall and having a rear end, and a fourth wall connected to the first wall and having a rear end connected to the rear end of the third wall, wherein at least a portion of the third and fourth walls are increasingly further from each other with increasing distance from the rear ends.

In still yet another embodiment of the present invention, a method for converting a transportable hauling container, having a first, second, third, and fourth wall, first and second flaps pivotally attached on either side of a longitudinal centerline of said first wall, first and second movable portions pivotally connected to said third and fourth walls, respectively, and at least one door that form an enclosure, from a first configuration to a more aerodynamic configuration, includes turning a first door toward an interior or exterior surface of the first movable portion and moving a rear end of the first movable portion to a longitudinal centerline of the container. The method also includes moving a rear end of the second movable portion to the longitudinal centerline of the container, lowering the first flap alongside an exterior surface of the first movable portion, and lowering the second flap alongside an exterior surface of the second movable portion. Additionally, the method includes securing the first flap to the first movable portion, securing the second flap to the second movable portion, and securing the rear end of the first movable portion to the rear end of the second movable portion.

The drag experienced by the trailer of the present invention can be decreased by about 40% over the air speed range of 30 miles per hour (mph) to 70 mph. When attached to a non-aerodynamic cab, the drag is anticipated to be between 40% and 70% less for the reduced-drag trailer compared to the drag of a conventional trailer over the same speed range. Further, when attached to an aerodynamic cab, the reduction in drag of this reduced-drag trailer is anticipated to be 50% to 70% when compared to the drag of an aerodynamic cab with a conventional trailer.

Because the aerodynamic drag is a significant component in the overall energy consumption of tractor-trailers when moving at highway speeds, it is anticipated that a reduced-drag trailer and method according to the present invention can reduce energy consumption by about 15% or more. Aerodynamic drag assumes greater relative importance in terms of energy consumption at higher speeds and with reduced loads. Thus, the benefits of the reduced-drag trailer of the present invention can increase with increasing speeds and partial loads. The cost of fabricating or retrofitting trailers to the reduced-drag or convertible reduced-drag configuration can be recovered quickly, depending on the nature of the owners' operations. Costs can be minimized with the use of existing, readily available components. Expected ancillary benefits include better handling, because of the smoother airflow around the vehicle, and reduction in turbulence and draft spray for adjacent and overtaking vehicles. These ancillary benefits can further reduce highway accidents. These benefits can be realized without increasing the overall length of the trailer and the increase in weight associated with these changes is insignificant in relation to the gross vehicle weight. Furthermore, sufficiently light individual components can be included so as to be handled and arranged by a single person of average strength.

These and other advantages of the present invention will become apparent to those skilled in the art upon a reading of the following descriptions of the invention and a study of the several figures of the drawings.

BRIEF DESCRIPTION OF THE DRAWINGS

The present invention will be readily understood by the following detailed description in conjunction with the accompanying drawings, wherein like reference numerals designate like elements.

FIG. 1A is a side view of a conventional tractor-trailer.

FIG. 1B is a top view of the conventional tractor-trailer of FIG. 1A.

FIG. 4A is a side view of the trailer of FIG. 3B in aerodynamic configuration, in accordance with an embodiment of the present invention.

FIG. 4B is a top view of the trailer of FIG. 4A.

FIG. 7A is a side view of a reduced-drag convertible trailer, in accordance with another embodiment of the present invention.

FIG. 7B is a top view of the reduced-drag convertible trailer of FIG. 7A.

FIG. 10C is a perspective view of the reduced-drag convertible trailer of FIG. 10A.

FIG. 11 is a process diagram of a method for converting a trailer of the present invention from a standard configuration to an aerodynamic configuration, in accordance with an embodiment of the present invention.

DESCRIPTION OF THE PREFERRED EMBODIMENTS

FIGS. 1A and 1B have been described above with reference to the prior art.

Figure 2A:
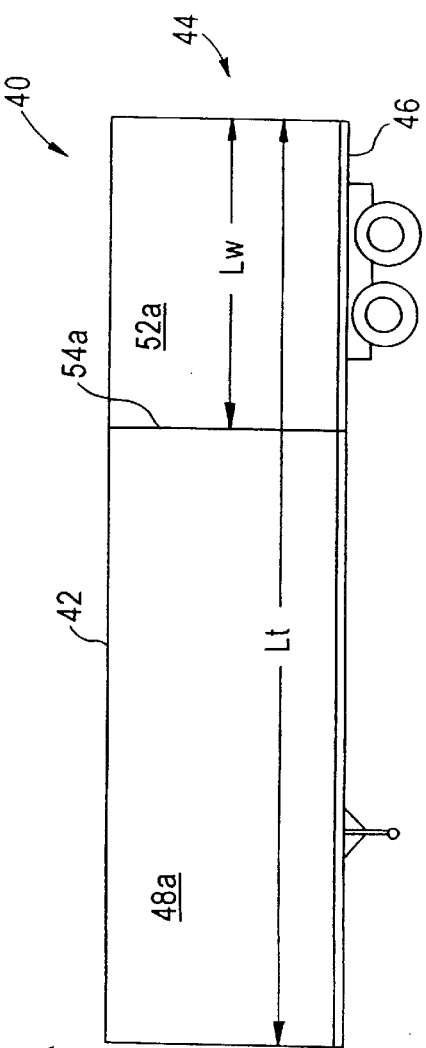
FIG. 2A is a side view of a reduced-drag trailer, in accordance with an embodiment of the present invention.
Figure 2B:
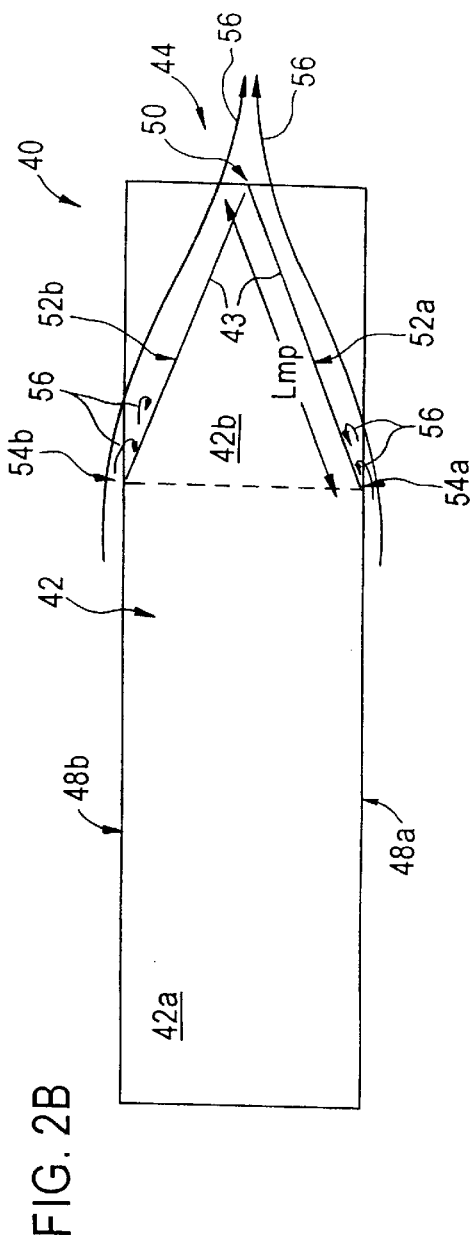
FIG. 2B is a top view of the reduced-drag trailer of FIG. 2A.

FIGS. 2A and 2B are side and top views, respectively, of a reduced-drag trailer 40 according to an embodiment of the present invention. A roof (e.g., a wall) 42 of the trailer 40 has a first portion 42a that is substantially rectangular, although it can have other shapes in alternative embodiments. A tapered portion 42b is also included in the roof 42 near a rear end 44 of the trailer 40, with two edges 43 that culminate at a same terminus or end 50. The terminus 50 can be substantially a point or can have a finite length. A floor (e.g., a wall) 46 opposes the roof 42, with side walls 48a and 48b extending between the roof first portion 42a and the floor 46. As can be seen in FIGS. 2A and 2B, the floor 46 extends to the end 50 of the roof 42, however, the floor 46 can have other alternative lengths, for example extending beyond the roof 42 and a top edge of each movable portion 52a, 52b substantially aligns with one of the roof edges 43. Additionally, the floor 46 can have a shape other than that shown in FIGS. 2A and 2B. For example, the floor 46 can have a tapered shape near the rear end 44 of the trailer 40, such as similar to the shape of the roof tapered portion 42b.

Also included in the trailer 40 are movable portions 52a and 52b that are pivotally connected to the side walls 48a, 48b at junctions 54a and 54b. The junctions 54a, 54b can be located at the intersection of the roof first portion 42a and tapered portion 42b, but can alternatively be located closer to or further from the rear end 44 than such intersection. The movable portions 52a, 52b can be connected to the side walls 48a, 48b through any suitable means, such as piano hinges or a series of strap hinges attached in the interior of the trailer 40, or a series of hoops encircling a rod which runs along a portion of or the fill length of the junction. The movable portions 52a, 52b can be turned toward each other such that they are in proximity to each other near the end 50 of the roof 42 and a top edge of each movable position 52a, 52b substantially aligns with one of the roof edges 43. In addition, through any suitable latching means (not shown) the two movable portions 52a, 52b can be fixed relative to each other, relative to the roof 42, and/or relative to the floor 46. As examples, chains and padlocks, braided steel cable, or custom-shaped hoops with spring loaded clips with or without locks can be used as latching means.

With the configuration of FIGS. 2A and 2B, the roof tapered portion 42b and the movable portions 52a, 52b form a wedge shape above the floor 46. The wedge length Lw, or length of the movable portions 52a, 52b, Lmp, can be in the range of about 1/100 the trailer length Lt to about the entire trailer length Lt, and more particularly the wedge length Lw, or movable portion lengths Lmp, can be about ¼ to about ½ the trailer length Lt. Still more particularly the lengths Lw or Lmp can be about ⅓ the trailer length Lt. This configuration can result in airflow near the rear end 44 of the trailer 40 while traveling that can be less turbulent, as is illustrated by the arrows 56. This reduced turbulence can lead to reduced drag experienced by the trailer 40, and therefore reduced fuel costs.

FIGS. 3A, 3B, 4A, and 4B depict side and top views of a trailer 60, in accordance with another embodiment of the present invention. In particular, trailer 60 is convertible from a standard configuration (shown in FIGS. 3A and 3B) to an aerodynamic configuration (shown in FIGS. 4A and 4B). The trailer includes a roof (e.g., a wall) 62, an opposing floor (e.g., a wall) 64, side walls 66, movable portions 68, and one or more doors 70.

Figure 3A:
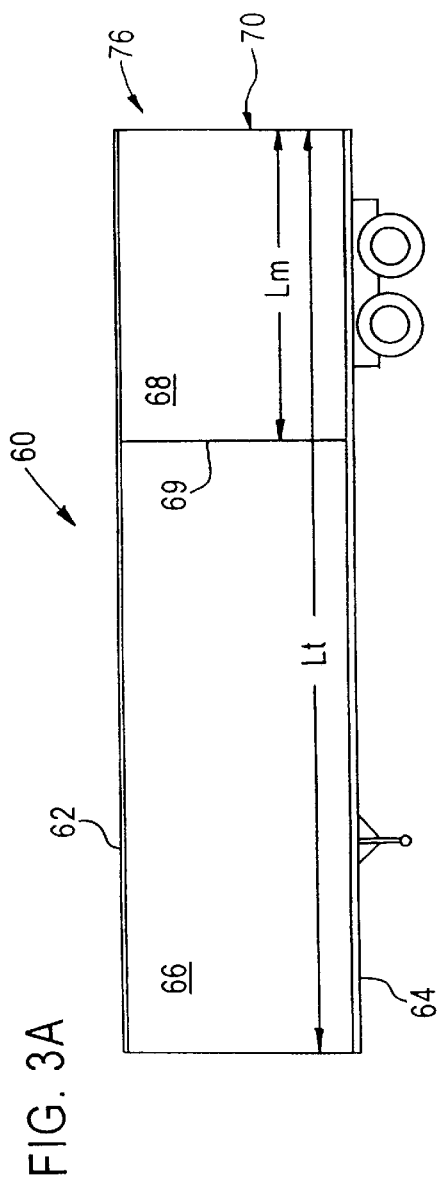
FIG. 3A is a side view of a reduced-drag convertible trailer in standard configuration, in accordance with an embodiment of the present invention.
Figure 3B:
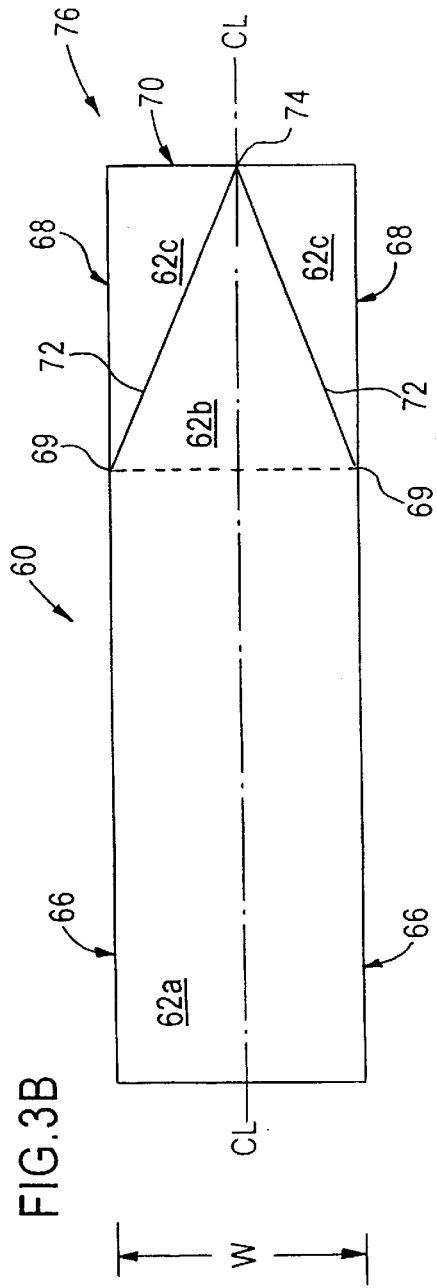
FIG. 3B is a top view of the trailer of FIG. 3A in standard configuration.

As shown in FIGS. 3A and 3B, the roof 62 includes a first portion 62a, a tapered portion 62b, and flaps 62c. The tapered portion has two edges 72 that culminate at a terminus or end 74 near a rear end 76 of the trailer 60. More particularly, the two edges 72 can converge, and the terminus 74 can be at about the centerline CL of the trailer 60. The flaps 62c are each connected to the tapered portion 62b along one of the edges 72 through pivoting means. For example, a piano hinge or a series of strap hinges can be attached to the tapered portion 62b and the flaps 62c in the interior of the trailer 60. Furthermore, weatherstripping can be attached to one or both of the tapered portion 62b and a flap 62c, thereby covering the edges 72. As examples, the weatherstripping can be formed of rubber or plastic, but any suitable material for resisting wind, precipitation, and foreign objects (e.g., rocks, dirt, etc.) can be used.

The movable portions 68 are pivotally connected to the side walls 66 and extend to the rear end 76 of the trailer 60. This connection can be aligned with the intersection of the roof first portion 62a and the roof tapered portion 62b as shown, or it can be closer or further from the rear end 76. As with the flaps 62c, the movable portions 68 can be connected to the side walls 66 by any suitable means, such as by a piano hinge or a series of strap hinges attached in the interior of the trailer 60, or a series of hoops encircling a rod which runs along a portion of or the full length of the junction. In addition, a length Lm of the movable portions 68 can be greater than 1/2 the width W of the trailer, and can be any suitable fraction of the trailer length Lt up to the full length of the trailer. For example, a length Lm in the range of about ¼ to about ½ of the trailer length Lt can work well. As a particular embodiment, a length Lm of about ⅓ the trailer length Lt can work well. As with the junction of the flaps and roof tapered portion, the junction 69 of the side walls 66 and movable portions 68 can be substantially covered by weatherstripping attached to one or both of the corresponding side wall and movable portion. This weatherstripping can be formed of any suitable wind, precipitation, and/or foreign object-resistant material, such as plastic or rubber.

The standard configuration illustrated by FIGS. 3A and 3B can be used, for example, when the trailer is filled with cargo in the region between the movable portions 68. In this configuration, the airflow near the trailer rear end 76 can be turbulent similar to the flow indicated by the arrows 20 in FIG. 1B for a conventional trailer. Therefore, the trailer in this standard configuration can experience similar drag and fuel consumption as a conventional trailer.

FIGS. 4A and 4B show the trailer 60 of FIGS. 3A and 3B in an aerodynamic configuration. While the two doors 70 can be pivoted outward and secured along the exterior of each associated movable portion 68, in the embodiment shown in FIG. 4B two doors 70 are pivoted inward toward an interior surface of the movable portion 68 to which each door 70 is attached. To facilitate such movement, the attachment mechanism that connects the doors 70 to the movable portions 68 can be configured to accommodate sufficient pivoting of the doors 70 relative to the movable portions 68. More specifically, the doors 70 are pivotable to positions that remain within the interior of the trailer 60, as defined after movement of the movable portions 68. In other embodiments, the doors 70 can be disengaged from the movable portions and otherwise positioned within the interior of the trailer 60.

Additionally, the movable portions 68 themselves are pivoted inward and the flaps 62c are pivoted downward over the movable portions 68, thus exposing the floor portions 34a. The movable portions 68 can be pivoted toward the centerline CL of the trailer such that their ends 67 are positioned near each other, for example as close as physically possible. More particularly, the doors 70 can be in physical contact with each other between the two movable portions 68, which can be best understood by reference to FIG. 4B. In alternative embodiments, the movable portions 68 can be positioned such that more space remains between the movable portion ends 67. For example, this can result when the movable portions 68 are more aligned with the roof tapered portion 62b (e.g., the movable portions 67 can be turned toward each other such that a top edge of each movable portion 67 substantially aligns with one of the roof tapered portion edges 72). In configurations with such a space, the space can remain uncovered, or can be filled or overlaid with a cover formed of, for example, cloth, rubber, plastic, wood, or metal. Further, such a cover can be attached to one or both of the movable portions, for example.

Securing clasps or latches 78 may be provided so that the flaps and the movable portions 68 may be secured upon conversion to the aerodynamic form. In particular, one or more elements of one or more latches 78a can be connected to one or both of the ends 67 of the movable portions 68 to maintain a relative position between the movable portions 68. Additionally, one or more elements of one or more latches 78b can be connected to one or both of each flap 62c and movable portion 68 for maintaining the relative position between each pair of flap 62c and movable portion 68. Also, one or more latches 78c can be connected across the flaps 62c instead or in addition to the latches 78a and 78b, thereby securing the flaps 62c relative to each other. Use of such latches 78c can also facilitate securing the top of the movable portion ends 67 relative to each other. As examples, chains and padlocks, braided steal cable, custom shaped hoops with spring-loaded clips with or without locks, or any other suitable latching mechanism known to those skilled in the art can be used as latches 78a, 78b, 78c.

Thus, the rear end 76 of the trailer can be converted from a substantially rectangular box shape to a wedge shape. The aerodynamic configuration can be used, for example, when the trailer is partially or completely empty, and more particularly, when there is no cargo above the floor portions 64a. With such an aerodynamic configuration, the airflow near the trailer rear end 76, illustrated by the arrows 80, can be less turbulent than that related to a conventional trailer (see FIG. 1B). With such reduced turbulence, the drag experienced by the trailer 60 can be significantly less than that experienced by a conventional trailer, thereby realizing significantly reduced fuel consumption and cost.

Figure 5:
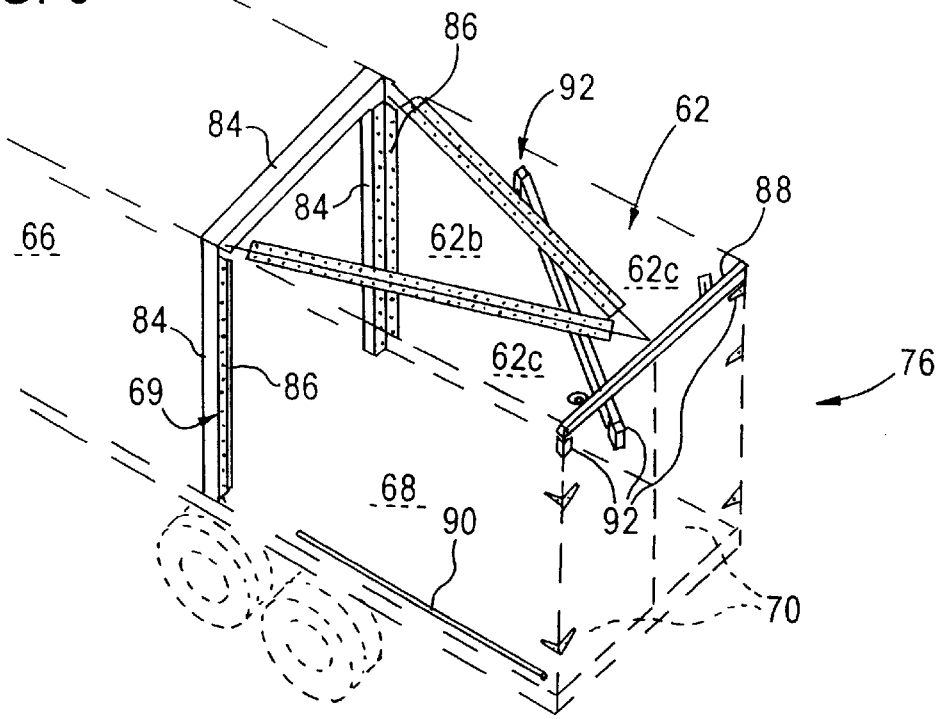
FIG. 5 is a perspective see-through view of a rear portion of a reduced-drag convertible trailer, in accordance with an embodiment of the present invention.

To enhance the structural integrity of the trailer both in transit and while loading/unloading, certain other structural arrangements and components can be included in the embodiments of the present invention. These can include positioning rear structural elements 84 near the junctions 69 at which the side walls 66 and movable portions 68 are connected, as shown in FIG. 5. For example, the rear structural elements can be positioned just ahead of the junctions 69. In addition, part or all of some or all of the hinge mechanisms at the junctions 69 may be attached to these structural elements. For example, one side of piano hinges 86 can be attached to the structural elements 84, while the other side of the piano hinges 86 are attached to the movable portions 68.

In addition or in the alternative, a structural element such as a transverse truss 88 can be provided in a removable fashion along the trailer rear end 76 at the roof 62. With this truss 88, additional support is provided to the combination of the roof tapered portion 62b and the flaps 62c, for example when the doors 70 are open. This truss 88 can be removed and stored in order to permit conversion of the trailer to its more aerodynamic configuration (for further details, refer to FIGS. 12A–12H and related text). A pole 90 can be included to facilitate repositioning of the transverse truss 88 and to support the roof flaps 62c during conversion. Brackets 92 can also be positioned within the trailer interior for securing the transverse truss 88 along the roof 62 and for storage. For example, the truss 88 can be stored along an interior surface of a movable portion 68, as illustrated in FIG. 5.

Figure 6:
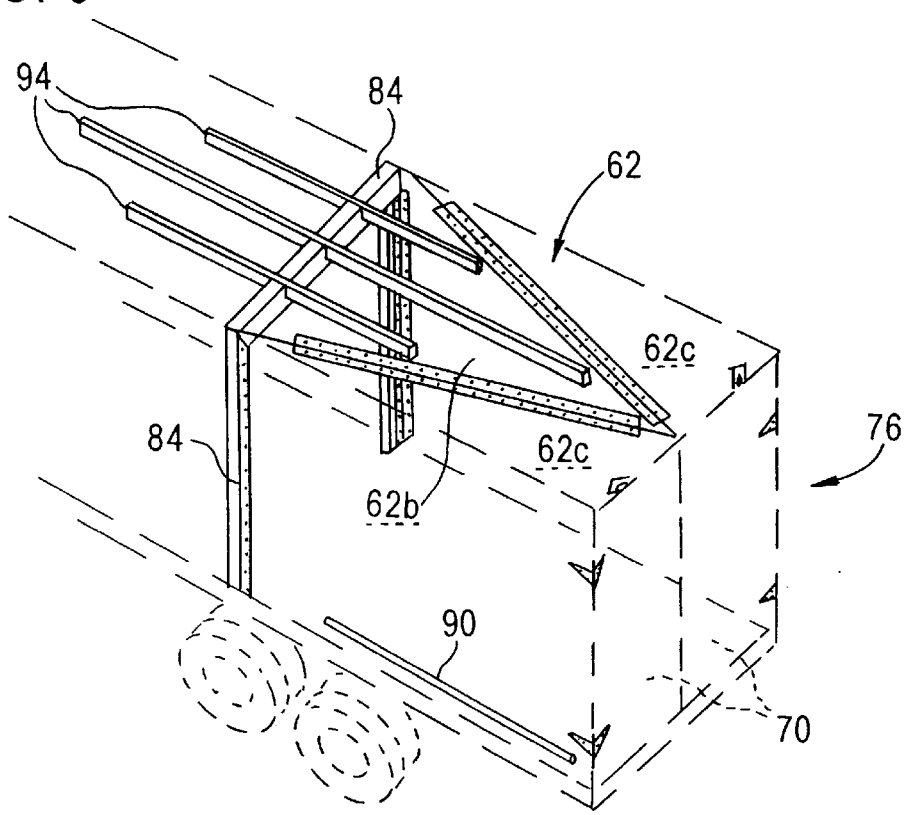
FIG. 6 is a perspective see-through view of a rear portion of a reduced-drag convertible trailer, in accordance with another embodiment of the present invention.

As shown in FIG. 6, stiffening members 94 can be included adjacent the roof 62 and cantilevered fore and aft of the rear structural elements 84. The structural elements 84 can be configured to accommodate the stiffening members 94. Such members 94 can provide support of the roof tapered portion 62b, including during loading and unloading. This configuration can provide additional roof support while facilitating a simpler conversion process than if the transverse truss is used (refer to FIGS. 12A–12H and related text).

FIGS. 7A and 7B are side and top views of a trailer 100 in an aerodynamic configuration, in accordance with yet another embodiment of the present invention. The trailer 100, in addition to those elements of the trailer 60 of FIGS. 3A, 3B, 4A, and 4B, include protrusions or moldings 102 on the movable portions 104. The moldings 102 can be either attached to or integral with the movable portions 104. More specifically, the moldings 102 are shaped so as to create a more aerodynamic surface at the junctions 106 of the flaps 62c and the movable portions 104. For example, the moldings 102 can partially or completely fill a space between the flaps 62c and movable portions 104. The moldings 102 can be formed of any suitable material, such as rubber, plastic, wood, or metal. This more aerodynamic surface in turn can encourage reduced turbulence near the junctions 106, resulting in a less turbulent airflow around the trailer rear end 76. The arrows 108 of FIG. 7B illustrate this airflow. Such reduced turbulence can reduce drag experienced by the trailer, and can thereby support reduced fuel consumption.

Figure 8A:
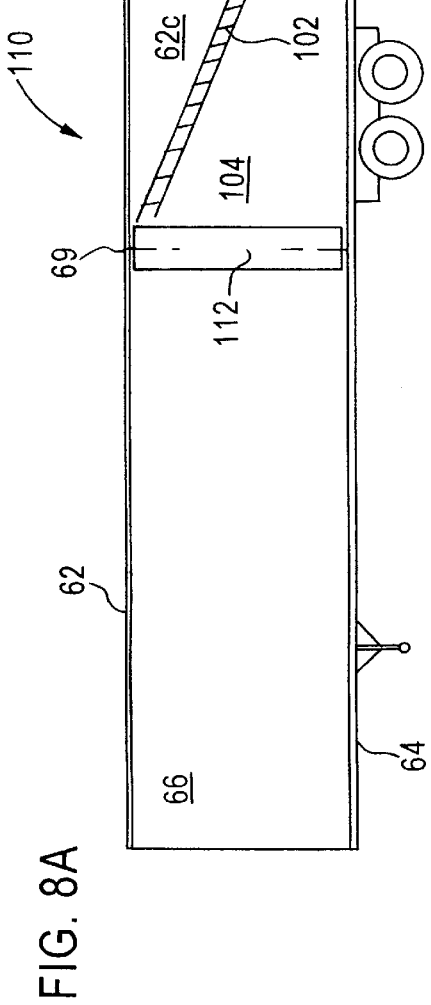
FIG. 8A is a side view of a reduced-drag convertible trailer with side vanes, in accordance with yet another embodiment of the present invention.
Figure 8B:
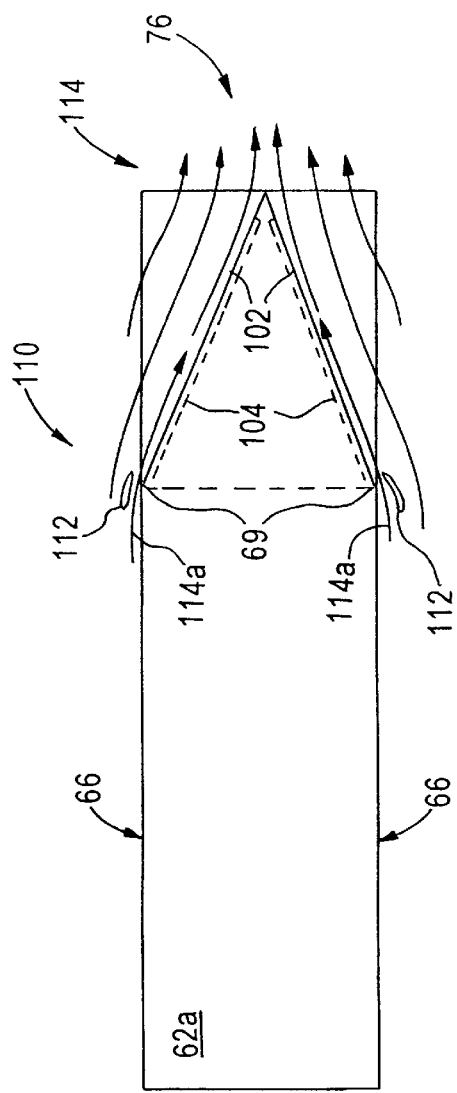
FIG. 8B is a top view of the reduced-drag convertible trailer of FIG. 8A.
Figure 8C:
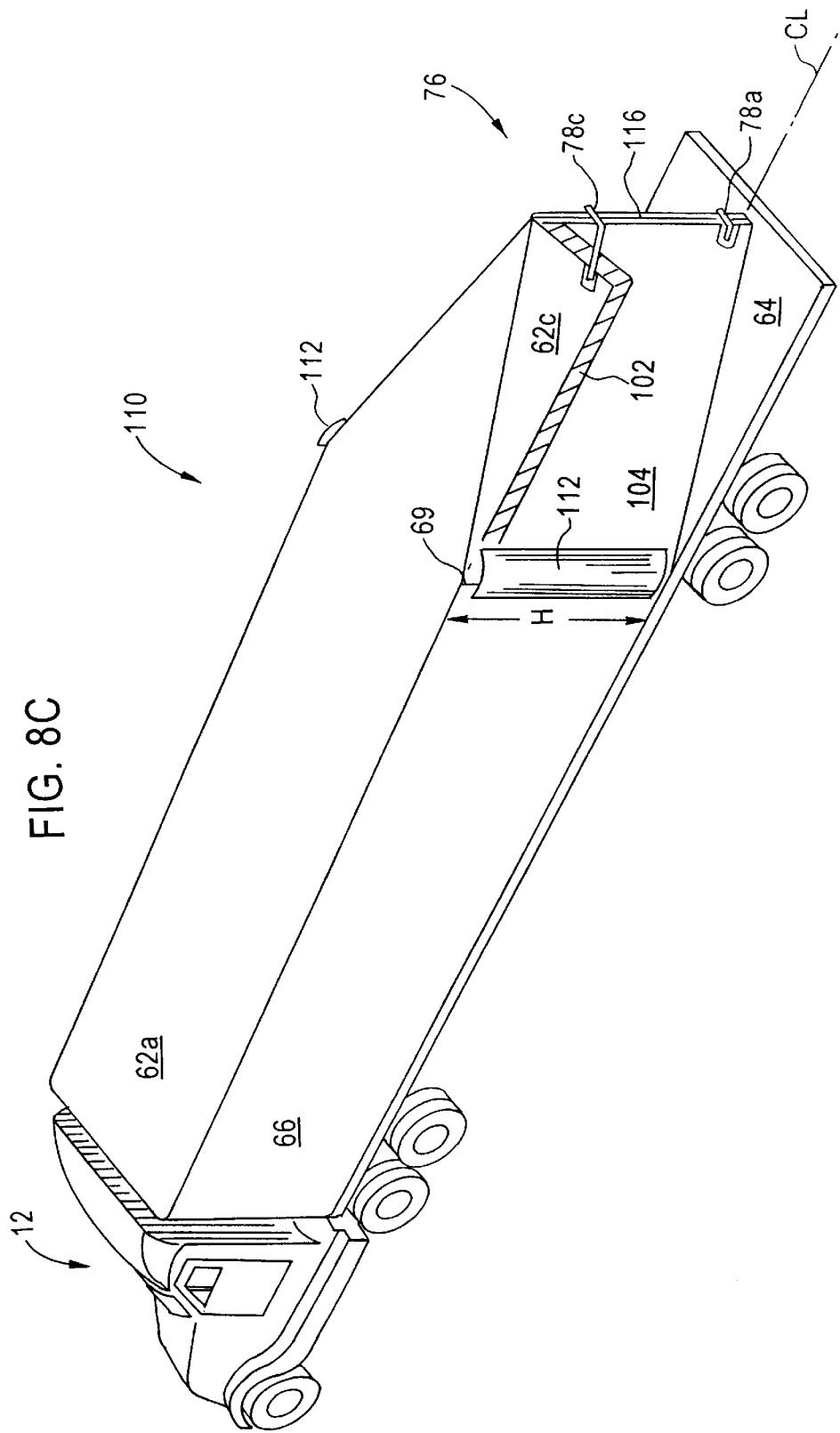
FIG. 8C is a perspective view of the reduced-drag convertible trailer of FIG. 8A.

A trailer 110 can also include vertical vanes or airfoils 112, according to still yet another embodiment of the present invention as shown in FIGS. 8A, 8B, and 8C. In the aerodynamic configuration, the airfoils 112 can be disposed over the junctions 69 of the side walls 66 and the movable portions 104. In addition, the airfoils 112 can extend from about the roof 62 to about the floor 64 as shown in FIG. 8A, however they can alternatively be shorter as well. Further, while one airfoil 112 is shown over each junction 69, alternative embodiments can include more than one airfoil disposed over each junction 69, for example extending substantially end-to-end along the length of the junction 69. Each airfoil 112 can be connected to one or both of the side wall 66 and movable portion 104 on a side of the trailer 110.

While in aerodynamic configuration, inclusion of the airfoils 112 over the junctions 69 can further reduce the turbulence of the airflow, indicated by the arrows 114, around the rear end 76 of the trailer 110. For example, the flow nearest the junctions 69, illustrated by the arrows 114a, can become less turbulent with the addition of the airfoils 112 in aerodynamic configuration. The overall turbulence of the airflow around the trailer is thereby reduced, which reduces the experienced drag and contributes to further reducing fuel consumption and costs.

FIG. 8C is a perspective view of the trailer 110 in conjunction with a cab 12. While the trailer 110 includes both moldings 102 and airfoils 112, alternative embodiments can include the airfoils 112 without the moldings 102. Furthermore, one or more latches 78 can be included. For example, a latch 78a can be connected to the movable portions 104 proximate the floor 64. Also, a latch 78c can be connected to the flaps 62c at the movable portion ends 116. When such a latch 78c is so employed, the tops of the rear ends of the movable portions 104 are also substantially secured in place. Although not shown, latches 78b can be connected between the flaps 62c and the movable portions 104. Of course, any number and configurations of suitable latches can be included in the trailer 112 to secure the relative positions of the flaps 62c and movable portions 104 while in the aerodynamic configuration.

In various embodiments, the airfoils 112 can be configured to be easily removed and attached. The airfoil 112 can be attached to either or both of the side wall 66 and movable portion 104. Also, the airfoil 112 can be attached and configured to lie over or not to lie over the junction 69 when in a standard configuration. Further, the airfoil is attached and configured to be disposed over and some distance P (see FIG. 9B) away from the junction 69 when the trailer is in aerodynamic configuration. In addition, the airfoil 112 can be attached and configured to automatically deploy over the junction 69 at the distance P when the trailer is converted to an aerodynamic configuration.

Figure 9A:
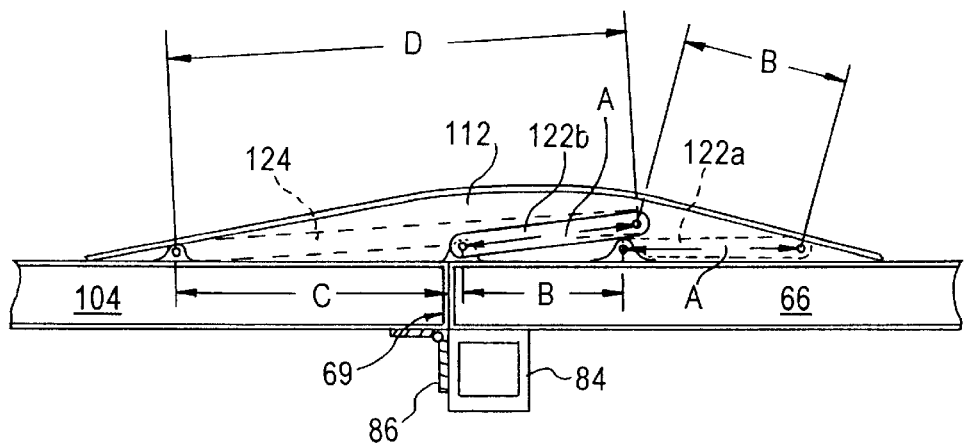
FIG. 9A is a close-up top view of an automatically deployable vane of a reduced-drag convertible trailer in a stowed position, in accordance with an embodiment of the present invention.
Figure 9B:
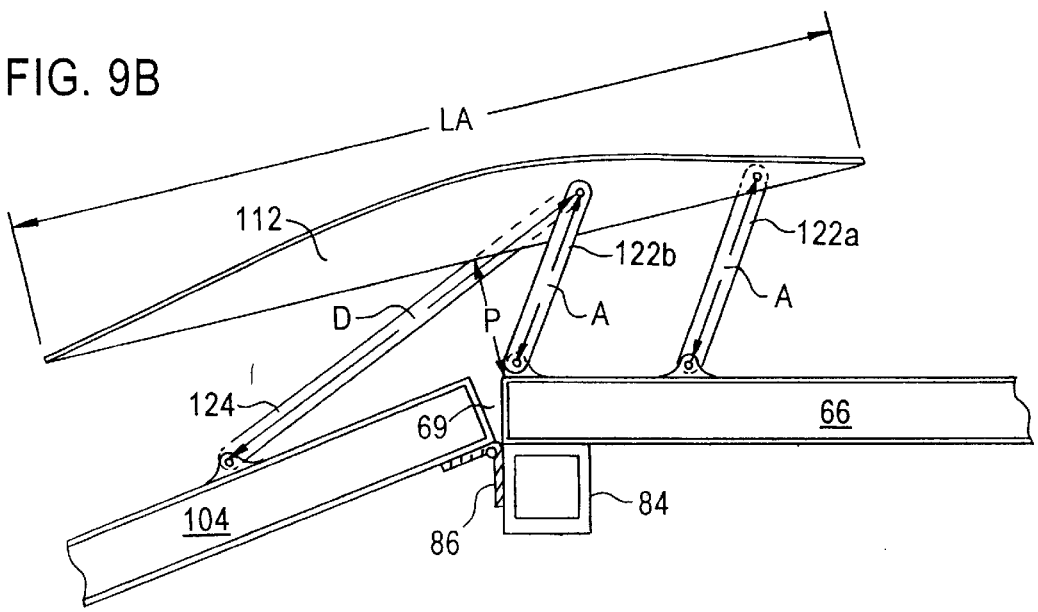
FIG. 9B is a close-up top view of the vane of FIG. 9A in a deployed position, in accordance with an embodiment of the present invention.

FIGS. 9A and 9B are top views of an airfoil 112 that is configured to deploy automatically when the movable portion 104 is pivoted relative to the side wall 66. Here the airfoil 112, having a length LA is connected to the side wall 66 with two links 122, each having a length A. The airfoil 112 is also connected to the movable portion 104 with a link 124 having a length D. One or more sets of these links 122, 124 can be connected to the airfoil 112 at various locations along a height H (see FIG. 8C) of the airfoil 112.

As shown in FIGS. 9A and 9B, a first end of the link 122b can be pivotally connected to the side wall 66 adjacent the junction 69, while a first end of the link 122a is pivotally connected to the side wall 66 at a distance B from the first end of link 122b. Likewise, second ends of the links 122a and 122b can be pivotally connected to the airfoil 112, separated by a distance about equal to the distance B. Additionally, the link 124 can have a first end pivotally connected to the movable portion 104 at a distance C from the junction 69. A second end of the link 124 can be pivotally connected to the airfoil 112 coincident with the link 122b. While various values of lengths A–D, P, and LA may be suitable, length A can be in the range of about two inches to about 24 inches, distance B can be in the range of about three inches to about 60 inches, distance C can be in the range of about three inches to about 60 inches, and length D can be in the range of about five inches to about 84 inches. In addition, the distance P can be in the range of about one inch to about 24 inches and the length LA can be in the range of about 12 inches to about 120 inches. In a particular embodiment, A can be about 5.75 inches, B can be about five inches, C can be about 7.75 inches, D can be about 13.25 inches, P can be about 3.63 inches, and LA can be about 26 inches.

Figure 10A:
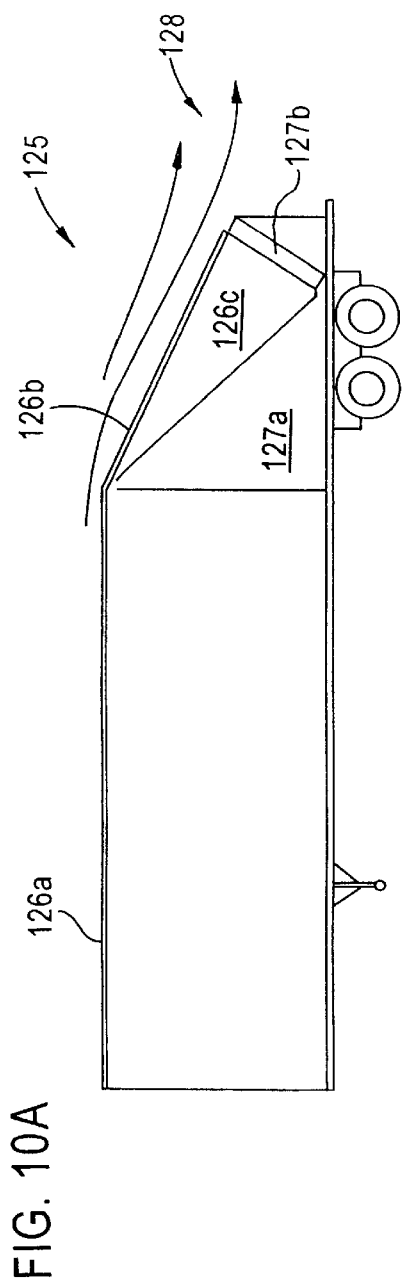
FIG. 10A is a side view of a reduced-drag convertible trailer, in accordance with another embodiment of the present invention.
Figure 10B:
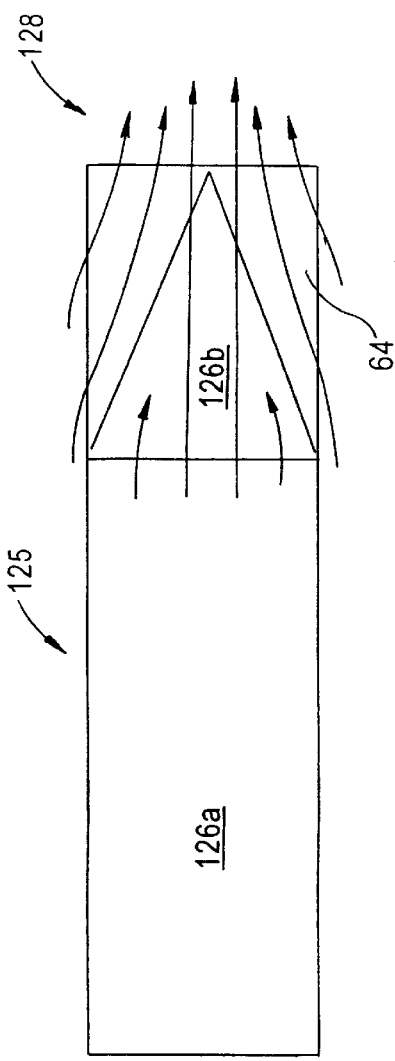
FIG. 10B is a top view of the reduced-drag convertible trailer of FIG. 10A.

In an alternative embodiment, a trailer 125 includes a roof (e.g., a wall) 126 having a first roof portion 126a pivotally connected to a tapered roof portion 1 26b, and two roof flaps 126c pivotally connected to the tapered roof portion 126b, as shown in FIGS. 10A–C. More specifically, the tapered roof portion 126b is configured to pivot downward relative to the first roof portion 126a Also, two movable portions 127 each can have a first portion. 127a and a pivotally connected flap 127b. Each flap 127b can be pivoted over a movable portion first portion 127a, and the roof flaps 126c can be folded over the flaps 127b. In alternative embodiments not shown, the flaps 127b can be folded over the lowered tapered roof portion 126b. In such configurations, the door or doors (see FIGS. 5 and 6) can be removed to the trailer floor (e.g., a wall), or if hinged near the floor, can be folded to the trailer floor for the aerodynamic configuration. With this configuration the airflow, indicated by the arrows 128, can be less turbulent which can result in less drag of the trailer. In a further embodiment of the present invention, a trailer can include the features of the trailer 125 in FIGS. 10A–C as well as one or more airfoils as illustrated by FIGS. 8A–C, 9A, and 9B. Such a configuration can result in less turbulent airflow around the end of the trailer, and therefore reduced drag.

Each of the above-described embodiments of the present invention, including their various combinations, can be included in a trailer design either during manufacture or as a retrofitting. For example, an existing conventional trailer can be cut, support members moved and/or added, and hinges and latches added to retrofit a conventional trailer to a convertible reduced-drag trailer according to various embodiments of the present invention. Furthermore, while embodiments have been described with reference to a trailer that can be connected to a cab for surface transport, the trailer can also be in the form of a transportable hauling container that can be carried on a rail car or other mode of transport instead of or in addition to surface transport by connection to a cab.

Converting from Standard to Aerodynamic Configuration

FIG. 11 is a process diagram of a method 130 for converting a trailer from a standard configuration to a more aerodynamic configuration, according to an embodiment of the present invention. The method 130 can include turning a first door toward an interior or exterior surface of a first movable portion in operation 132. In operation 134 a rear end of the first movable portion can be moved toward a longitudinal centerline (see FIG. 8C) of the trailer. A first flap also can be lowered alongside an exterior surface of the first movable portion, in operation 136. Similarly, operation 138 can include moving a rear end of the second movable portion toward a longitudinal centerline. Also, operation 140 can involve lowering a second flap alongside an exterior surface of the second movable portion. In addition, the rear end of the first movable portion can be secured to the rear end of the second movable portion in operation 142. In additional embodiments, each of the flaps can be secured to the other or to the movable portion alongside which it has been lowered. Additional embodiments of the present invention can be better understood with reference to FIGS. 12A–12H and the related discussion below.

Figure 12A:
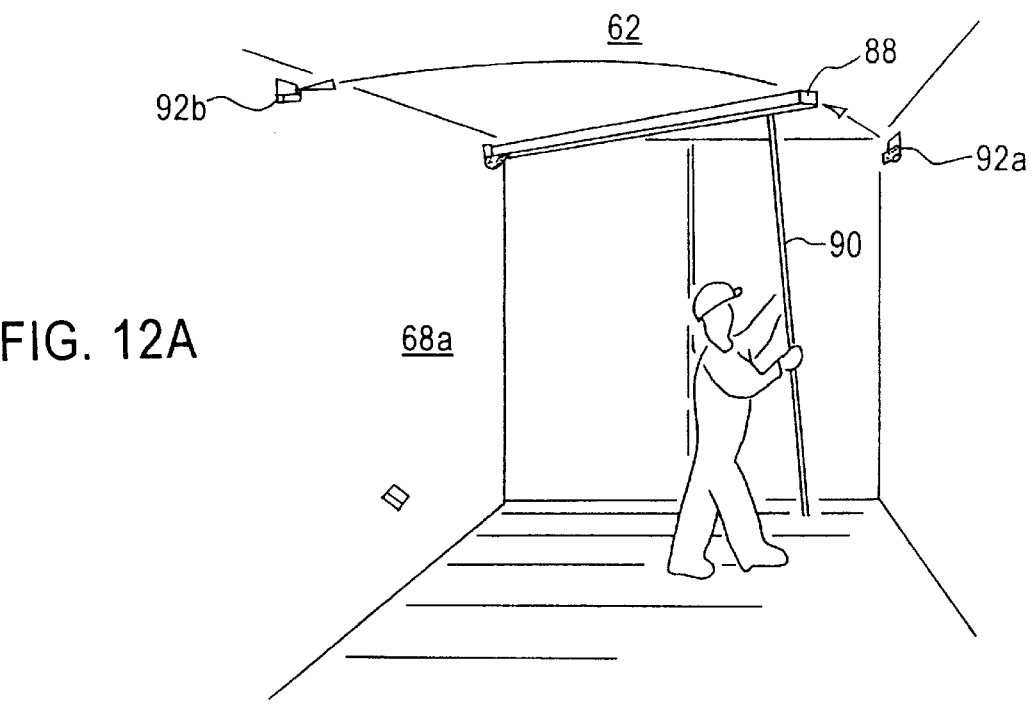
FIGS. 12A–12H are depictions of various operations included in a method for converting a trailer of the present invention from a standard configuration to an aerodynamic configuration, in accordance with an embodiment of the present invention.

FIGS. 12A–12H illustrate operations involved in converting a trailer with a transverse truss from a standard configuration to a more aerodynamic, reduced-drag configuration. As shown in FIG. 12A, from inside the trailer a first end of the transverse truss 88 is moved from its bracket 92a. The truss 88 is then turned about 90° toward the front of the trailer and the first end is positioned in another bracket 92b along the interior of the opposite movable portion 68a and near the roof 62. These operations can be facilitated by use of the pole 90, as shown in FIG. 12A. Of course, if the transverse truss 88 is not included in the trailer, for example if structural elements such as those in FIG. 6 are used instead, these operations are unnecessary.

Figure 12B:
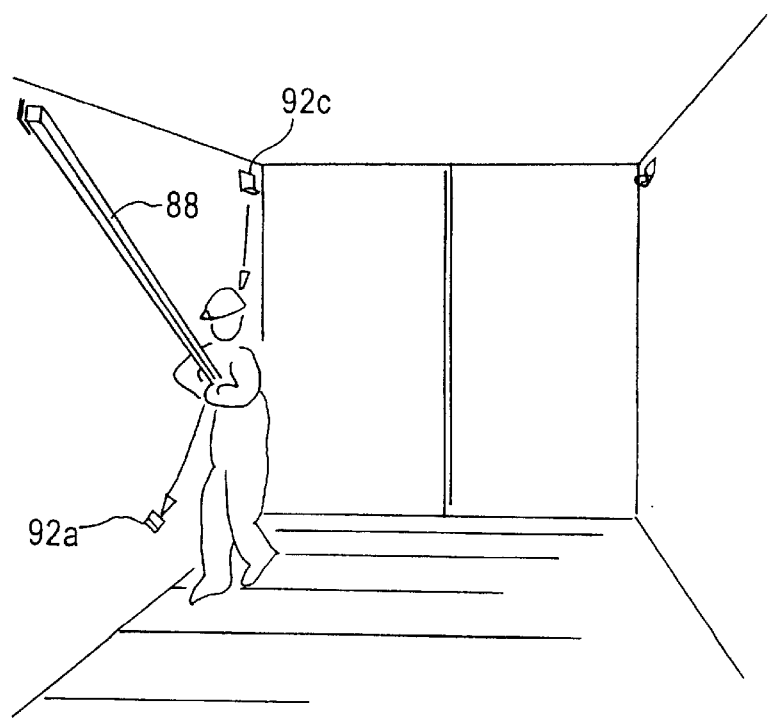
Figure 12C:
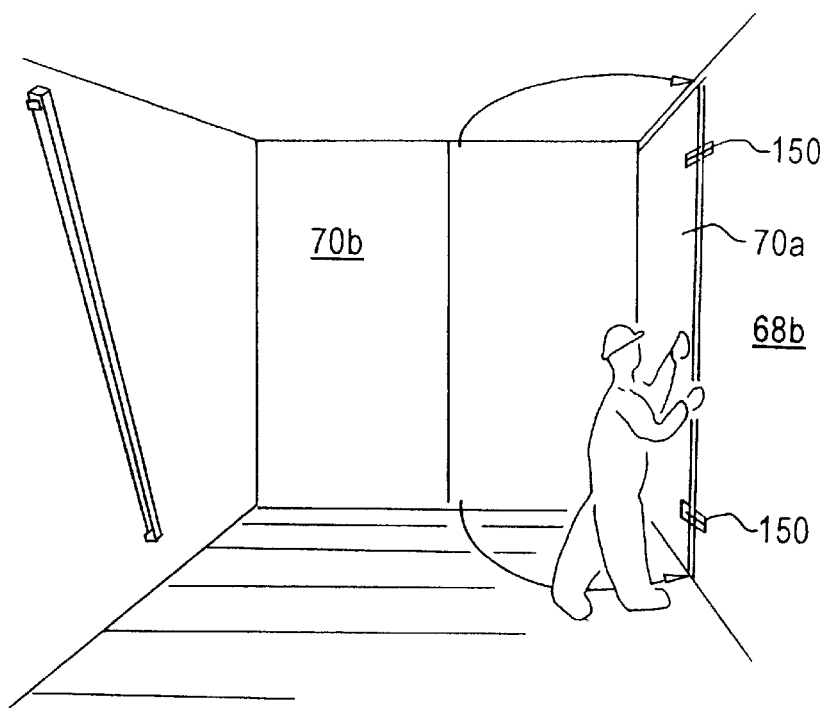

A second end of the transverse truss 88 is then removed from its bracket 92c and stowed in a lower bracket 92d along the same side of the trailer and somewhat closer to the rear end of the trailer, as shown in FIG. 12B. As shown in FIG. 12C, one of the doors 70a is then swung inwards toward an interior surface of the movable portion 68b to which the door 70a is attached. The door 70a can then be secured to the movable portion 68b with latches 150.

Figure 12D:
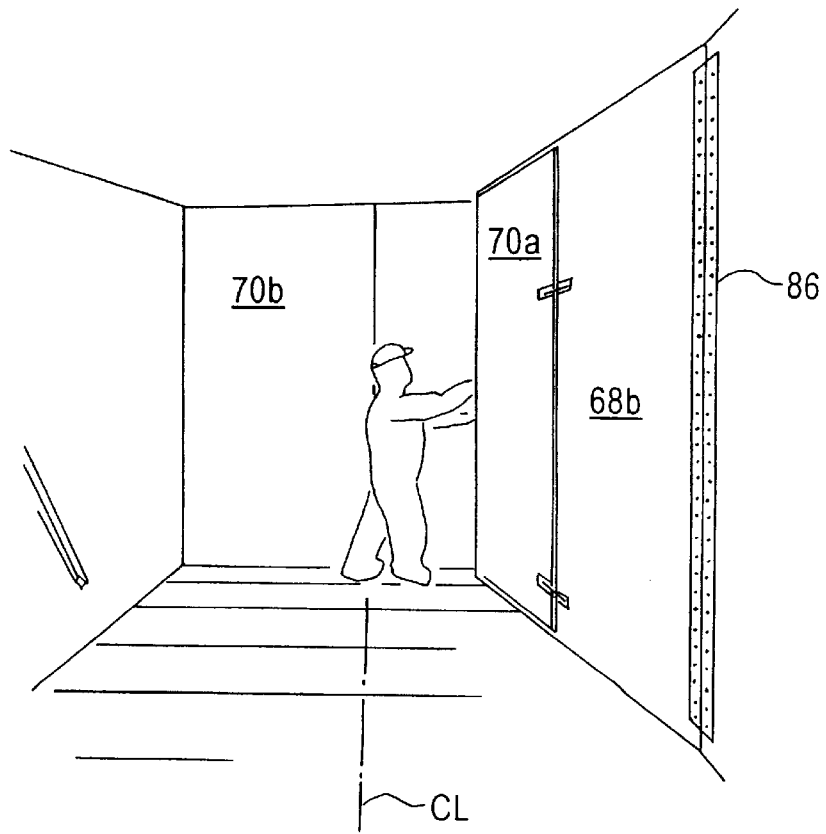
Figure 12E:
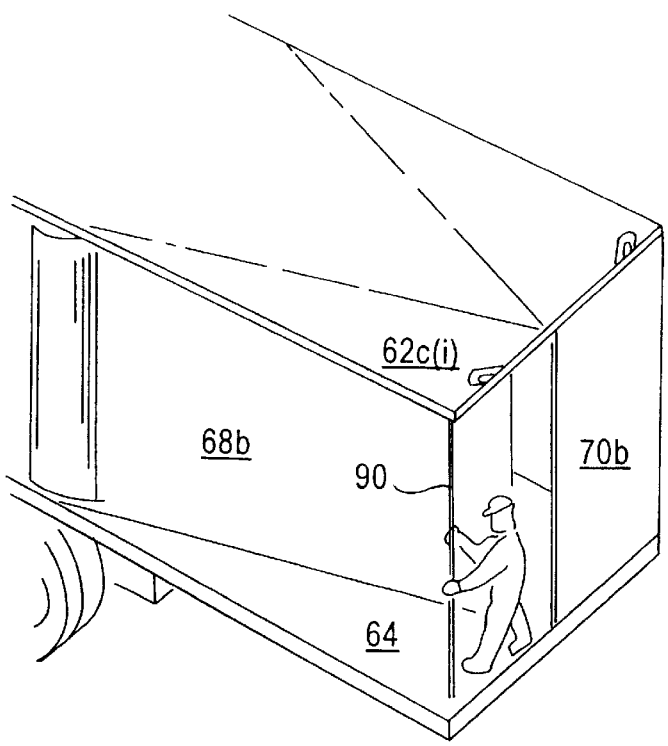
Figure 12F:
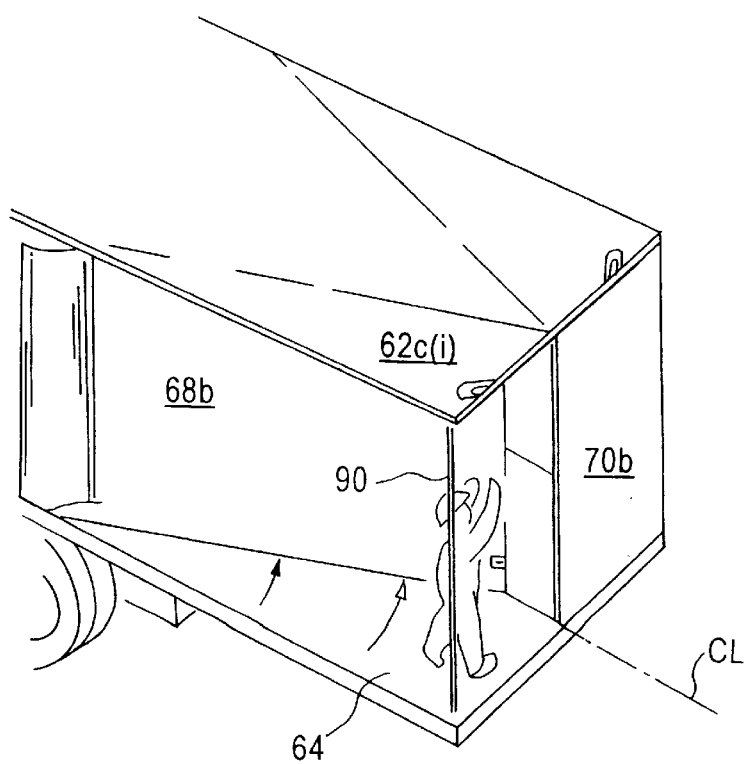

FIG. 12D illustrates that the movable portion 68b is pulled towards the longitudinal centerline CL of the trailer. In this position, the movable portion 68b can support the portions of the roof 62 above, including at least one of the roof flaps 62c. As can be understood with reference to FIG. 12E, the pole 90 is placed between the floor 64 and the now overhanging corner of the roof flap 62c(i). With this support of the flap 62c(i) provided by the pole, the movable portion 68b can be pivoted to the longitudinal centerline CL of the trailer, as depicted in FIG. 12F.

Figure 12G:
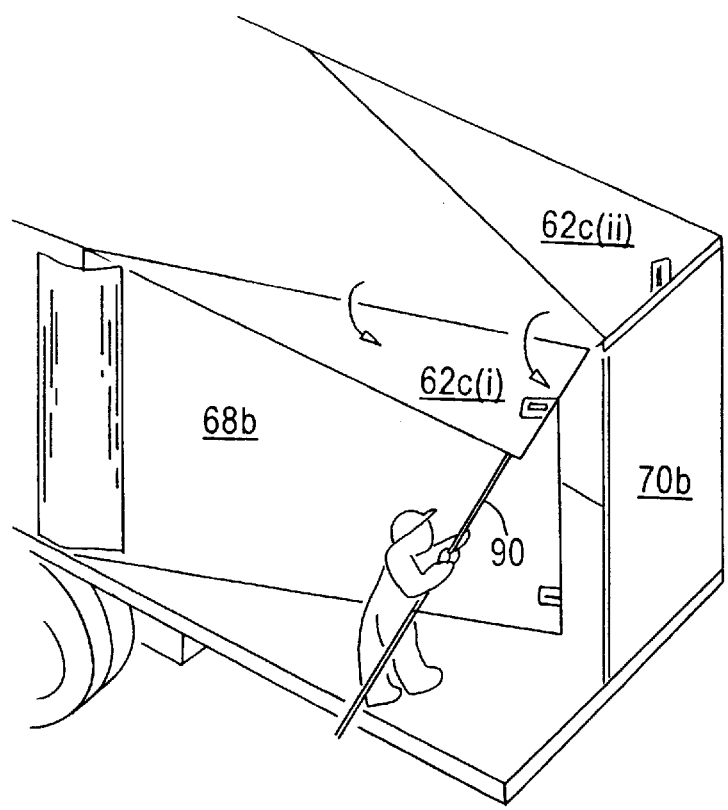
Figure 12H:
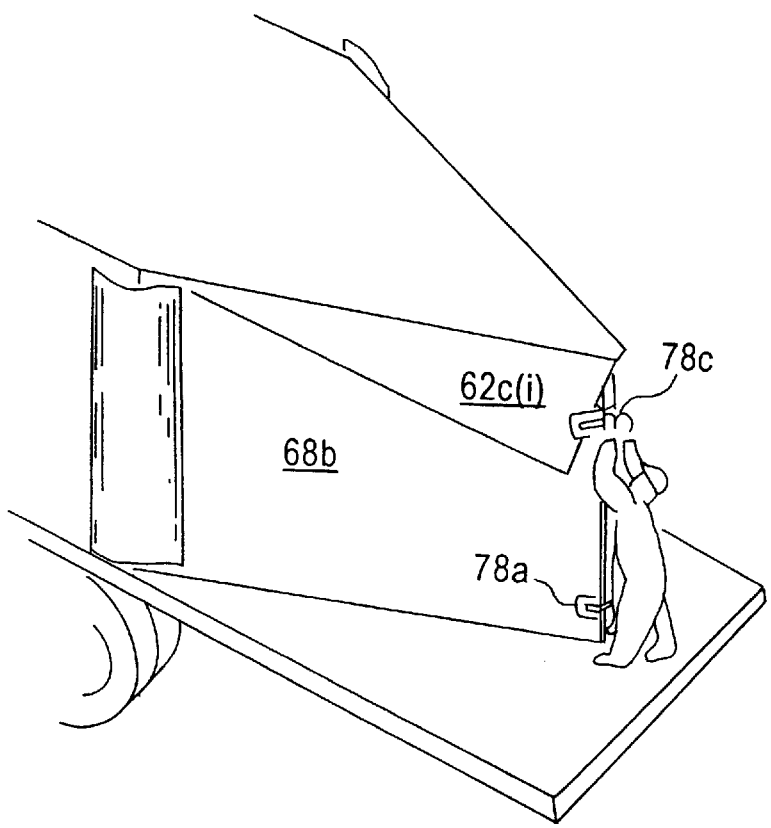

As FIG. 12G illustrates, as the pole 90 is removed, the flap 62c(i) is allowed to drop or is lowered alongside the exterior surface of the movable portion 68b. Operations corresponding to each of those described above with reference to FIGS. 12C–12G are then performed with the other door 70b, movable portion 68a, and flap 62c(ii) to arrive at the configuration depicted in FIG. 12H. Also shown in FIG. 12H, a latch or clasp 78a can be secured to fix each movable portion relative to the other. Also, a latch or clasp 78c can be secured to fix the flaps together around the movable portions. Although not shown, in addition or instead of the latch 78c, a latch or clasp can be secured to connect each flap 62c to its nearby movable portion 68.

Variations can be made on the order of the above-described operations, as well as on the exclusion of some operations and inclusion of additional operations in alternative embodiments of the present invention. However, generally the conversion process can be completed in less than about 5 minutes, with the operations shown in FIGS. 12A–12H taking about three minutes. Thus, in such a short period of time, the trailer can be converted from a standard configuration which can hold a conventional amount of cargo, to an aerodynamic configuration that can realize significant fuel cost savings. Of course, the above-described operations also can be substantially reversed to effect a conversion from an aerodynamic configuration to a standard configuration.

Wind Tunnel Test Results for Standard and Aerodynamic Trailers

Scale models (about 1:48) of standard trailers and reduced-drag trailers in an aerodynamic configuration ("aerodynamic trailer") according to an embodiment of the present invention (such as that shown in FIGS. 7A and 7B and the corresponding description herein) were subjected to wind tunnel tests for air speeds ranging from 30 miles per hour (mph) to 70 mph. The wind tunnel length was about eight times the length of the model trailers. It was of fixed floor design rather than movable belt construction, and the models were placed in the center of the cross-sectional area of the wind tunnel. Observation ports and appropriate devices for the measurement of air speed and the aerodynamic drag on the various models tested were provided.

Figure 13:
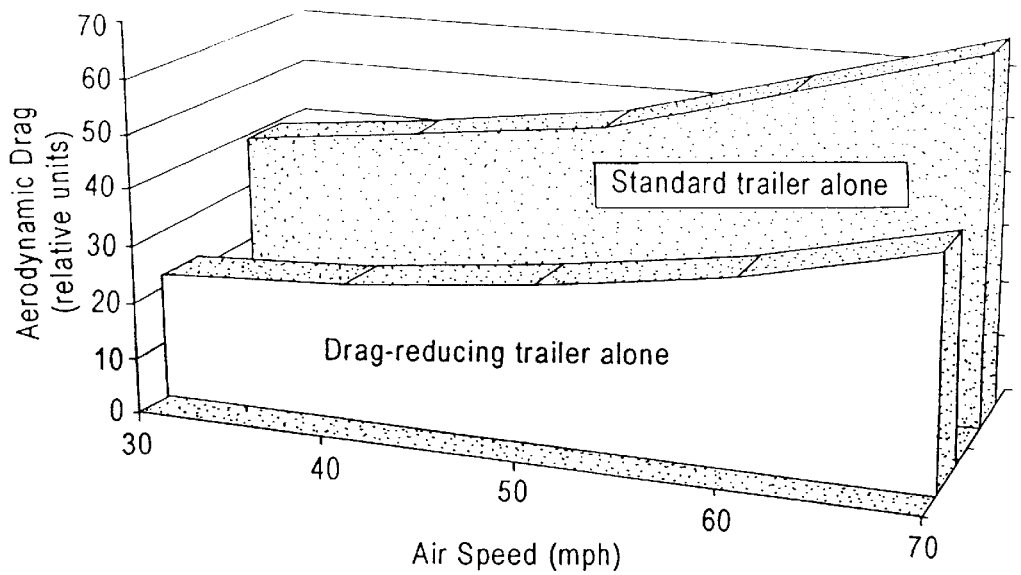
FIG. 13 is a three-dimensional graph of aerodynamic drag versus airspeed of a standard trailer alone and a reduced-drag trailer alone.
Figure 14:
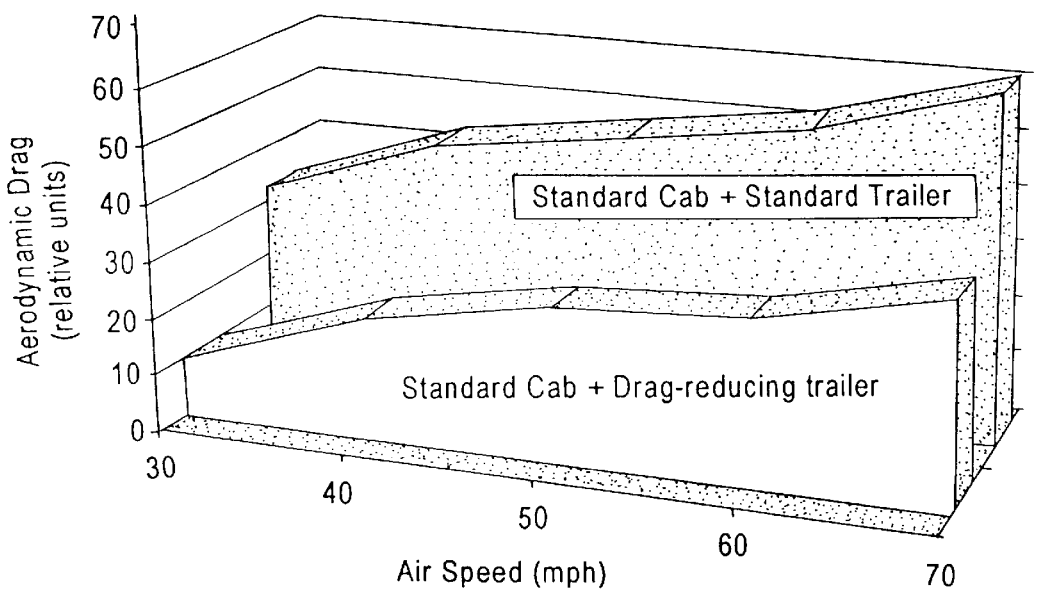
FIG. 14 is a three-dimensional graph of aerodynamic drag versus air speed of a standard trailer and a reduced-drag trailer, each with a conventional cab.

The following six types of tests were run, with multiple replications of each test:

1. Standard trailer alone
2. Aerodynamic trailer alone
3. Standard trailer with standard cab (i.e., non-streamlined cab)
4. Aerodynamic trailer with standard cab
5. Standard trailer with streamlined cab
6. Aerodynamic trailer with streamlined cab The resulting data have been plotted in the graphs of FIGS. 13–16 to illustrate case by case comparisons. FIG. 13 is a graph of the aerodynamic drag versus air speed of a standard trailer alone and an aerodynamic trailer. As can be seen, across the full range of airspeeds, the aerodynamic drag experienced by the aerodynamic trailer is about 40% less than that experienced by the standard trailer. FIG. 14 is a graph of the aerodynamic drag versus air speed of a standard cab/standard trailer combination and a standard cab/aerodynamic trailer combination. This graph illustrates an aerodynamic drag reduction of between 40% and 70% with the aerodynamic trailer of the present invention.

Figure 15:
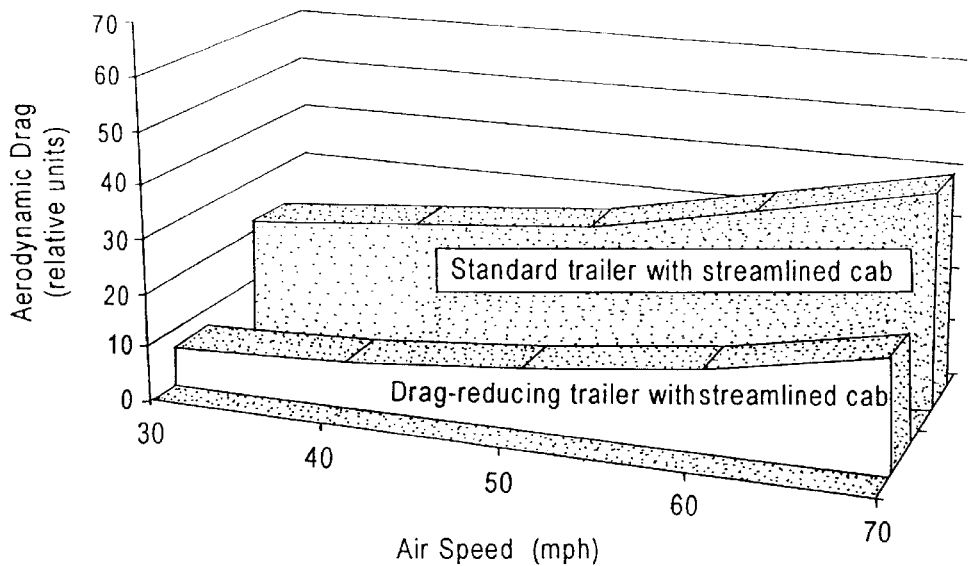
FIG. 15 is a three-dimensional graph of aerodynamic drag versus air speed of a standard trailer and a reduced-drag trailer, each with a streamlined cab.
Figure 16:
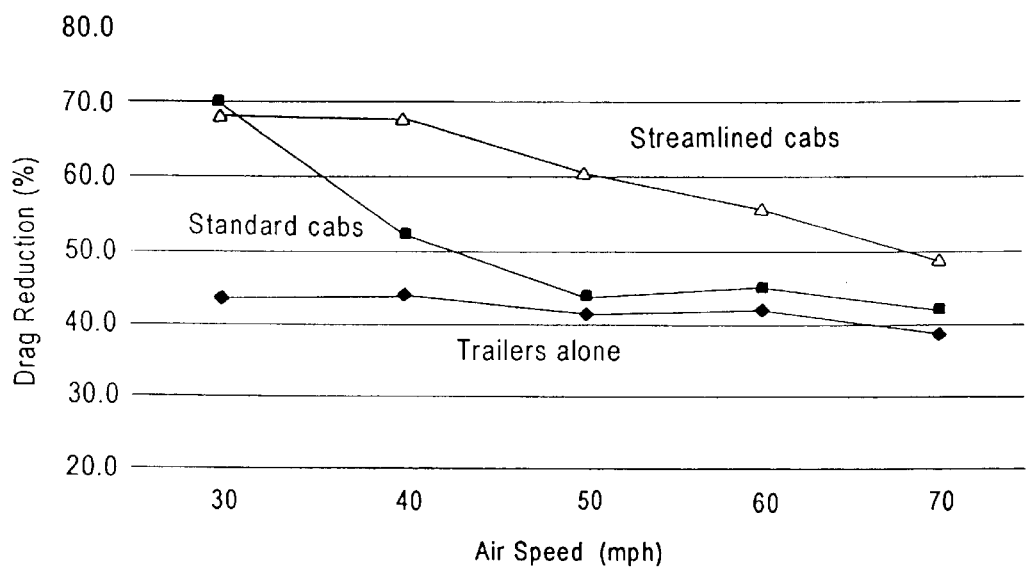
FIG. 16 is a line graph of percentage drag reduction, over a conventional trailer drag, versus air speed of a reduced-drag convertible trailer alone, in combination with a standard cab, and in combination with an streamlined cab.

FIG. 15 is a graph of the aerodynamic drag versus air speed for the standard trailer with a streamlined cab and the aerodynamic trailer with a streamlined cab. As can be seen from the graph, the aerodynamic trailer combination experienced about 50% to about 70% less aerodynamic drag than the standard trailer combination. These reductions in experienced drag, as percentages of the drag experienced by conventional configurations, are plotted versus air speed in FIG. 16. This graph illustrates the significant benefits of the aerodynamic trailer over conventional trailers, across all air speeds including highway speeds, e.g., in the range of 50–70 mph. In addition, at least the same benefits are realized when the aerodynamic trailer is coupled with a standard cab. Further, the benefits of the aerodynamic trailer are magnified with the addition of a streamlined cab. As is clear from these charts the present invention dramatically reduces aerodynamic drag when compared to the alternatives.

The data of the above charts is listed in Table 1 below. Comparing the benefits of the aerodynamic trailer to the impact of a streamlined cab identifies further advantages of the aerodynamic trailer. More specifically, these data indicate that using reduced-drag trailers with standard cabs for a 42% to 70% drag reduction (compare data columns 3 & 4 of Table 1) would yield a greater benefit than the alternate use of streamlined tractors which offer drag reduction of only 33% to 42% (compare data columns 3 & 5 of Table 1). Thus, replacing existing trailers with reduced-drag or convertible reduced-drag trailers, or modifying existing trailers to convertible reduced-drag trailers may be of greater value than purchase of streamlined tractors. Of course, the greatest drag reduction, 66% to 82%, will be achieved with both the aerodynamic trailer and a streamlined cab (compare data columns 3 & 6 of Table 1).

TABLE 1

AERODYNAMIC DRAG vs. AIR SPEED

| Speed (mph) | Standard Trailer Alone | Aero-dynamic Trailer Alone | Standard Trailer with Standard Cab | Aerodynamic Trailer with Standard Cab | Standard Trailer with Streamlined Cab | Aerodynamic Trailer with Streamlined Cab |
|---|---|---|---|---|---|---|
| 30 | 39 | 22 | 33 | 10 | 22 | 7 |
| 40 | 43 | 24 | 44 | 21 | 25 | 8 |
| 50 | 48 | 28 | 48 | 27 | 28 | 11 |
| 60 | 57 | 33 | 53 | 29 | 34 | 15 |
| 70 | 67 | 41 | 62 | 36 | 41 | 21 |

Additional Benefits of the Present Invention

Standard tractor-trailers can be difficult to handle because of the considerable turbulence near the rear end. When empty and traveling across the path of strong winds, the relatively light weight of the trailer and high turbulence at the rear end of the tractor-trailer can make handling especially difficult. Reductions in turbulence can therefore produce corresponding improvements in handling. This could result in a corresponding reduction in the risk of accidents.

Standard tractor-trailers may also pose risks to other vehicles. Passenger vehicles in particular can be buffeted by rear end turbulence when overtaking tractor-trailers. In addition, vehicles traveling directly behind or in adjacent lanes behind tractor-trailers can suffer from serious spray suspension during wet conditions. Most of this "draft spray" problem arises because of the high rear end turbulence. Therefore, with reduction of such turbulence, the various embodiments of the present invention should produce less such spray.

In summary, the present invention provides a device and method for converting empty or partially empty trailers to a more safe and aerodynamic configuration that can realize reduced fuel consumption per mile and concomitant reduced fuel cost. The invention has been described herein in terms of several preferred embodiments. Other embodiments of the invention, including alternatives, modifications, permutations and equivalents of the embodiments described herein, will be apparent to those skilled in the art from consideration of the specification, study of the drawings, and practice of the invention. For example, while a method has been described to include folding the door or doors to the movable portions to convert the trailer, alternatively the door or doors can be folded to or removed to the floor of the trailer. The embodiments and preferred features described above should be considered exemplary, with the invention being defined by the appended claims, which therefore include all such alternatives, modifications, permutations and equivalents as fall within the true spirit and scope of the present invention.

What is claimed is:

1. transportable hauling container, comprising:
    a first wall having an end and having two edges that culminate at a same terminus at said end;
    a second wall that opposes said first wall;
    a third wall extending between said first and second wall;
    a first movable portion pivotally connected at a first junction to said third wall, wherein said first movable portion is located proximate said end and is configured to be movable relative to said third wall;
    a fourth wall extending between said first and second wall and opposing said third wall;
    at least one flap pivotally connected to said first wall near said end, wherein said at least one flap is movable relative to said first wall;
    at least one latching means for substantially securing said at least one flap relative to said first wall; and
    a door movably connected to said first movable portion.

2. The transportable hauling container as recited in claim 1, further comprising:
    a second movable portion pivotally connected at a second junction to said fourth wall, wherein said second movable portion is located proximate said end and is configured to be movable relative to said fourth wall; and
    at least one latching means for substantially fixing at least one of said first movable portion and second movable portion relative to at least one of said third wall and said fourth wall, respectively.

3. The transportable hauling container as recited in claim 2, further comprising at least one vane, wherein each of at least one vane is capable of overlying at least a portion of one of said first junction and said second junction.

4. The transportable hauling container as recited in claim 2, wherein said third wall has a first length, said first movable portion has a second length, said fourth wall has a third length, and said second movable portion has a fourth length, and wherein a ratio of said second length to said first length and a ratio of said fourth length to said third length is in a range of about 1:1 to about 1:3.

5. The transportable hauling container as recited in claim 4, wherein said ratio of said second length to said first length and said ratio of said fourth length to said third length is about 1:2.

6. The transportable hauling container as recited in claim 2, wherein said first movable portion and said second movable portion each include protrusions, and wherein said at least one flap includes a flap edge that is distal said first wall, and wherein when said first movable portion and said second movable portion are positioned proximate said first and second edges of said first wall, and said at least one flap is lowered over one of said first movable portion and said second movable portion, said flap edge is proximate said protrusions on the corresponding one of said first movable portion and said second movable portion.

7. The transportable hauling container as recited in claim 2, further including a structural member removably attached to said first wall and said flaps near said first end, wherein said structural member is configured to maintain said first wall and said flaps in rigid alignment.

8. The transportable hauling container as recited in claim 2, further including at least one structural member connected to said first wall extending from near said first end to distal said first end.

9. The transportable hauling container as recited in claim 3, wherein each of said at least one vane is configured to move automatically when a corresponding one of said first movable portion and said second movable portion is moved relative to said corresponding one of said third wall and said fourth wall.

10. The transportable hauling container as recited in claim 2, further including weatherstripping overlying at least a portion of a junction between said first wall and each of said at least one flap.

11. The transportable hauling container as recited in claim 2, wherein each of an edge of said first movable portion and an edge of said second movable portion is configured to substantially align with one of said two edges of said first wall.

12. The transportable hauling container as recited in claim 1, wherein said first movable portion includes a first portion and a flap pivotally connected to said first portion, and wherein said first wall includes a first portion and a second portion, said second portion of said first wall being near said first movable portion and being pivotally connected to said first portion of said first wall.

13. A method for converting a transportable hauling container from a less aerodynamic configuration to a more aerodynamic configuration, comprising:
    turning a door toward an interior surface of a first movable portion;
    moving a rear end of said first movable portion toward a longitudinal centerline of said container;
    moving a rear end of a second movable portion toward said longitudinal centerline of said container,
    lowering a first flap over an exterior surface of said first movable portion;
    lowering a second flap over an exterior surface of said second movable portion; and
    securing said rear end of said first movable portion relative said rear end of said second movable portion.

14. The method as recited in claim 13, further comprising:
    securing said first flap to said first movable portion; and
    securing said second flap to said second movable portion.

15. The method as recited in claim 13, further comprising:
    moving said rear end of said first movable portion part way toward said longitudinal centerline of said container;
    supporting said first flap substantially in-plane with said first wall before moving said rear end of said first movable portion to said longitudinal centerline of said container;
    moving said rear end of said second movable portion part way toward said longitudinal centerline of said container; and
    supporting said second flap substantially in-plane with said first wall before moving said rear end of said second movable portion to said longitudinal centerline of said container.

16. The method as recited in claim 15, further comprising:
    moving a first end of a transverse support member from near one of said first and second flaps and said rear end of one of said first and second movable portions, to near an interior surface of the other of said first and second movable portions; and
    moving a second end of said transverse support member from near the other of said first and second flaps and said rear end of the other of said first and second movable portions, to near an interior surface of said other of said first and second movable portions and distal said other of said first and second flaps.

17. The method as recited in claim 13, wherein said first movable portion includes a first portion and a flap portion and said second movable portion includes a first portion and a flap portion, said method further comprising:
    pivoting said flap portion of said first movable portion alongside said first portion of said first movable portion; and
    pivoting said flap portion of said second movable portion alongside said first portion of said second movable portion.

18. The method as recited in claim 17, wherein:
    said flap portion of said first movable portion and said first flap are lowered such that said flap portion of said first movable portion is between said first flap and said first portion of said first movable portion; and
    said flap portion of said second movable portion and said second flap are lowered such that said flap portion of said second movable portion is between said second flap and said first portion of said second movable portion.

* * * * *

UNITED STATES PATENT AND TRADEMARK OFFICE
CERTIFICATE OF CORRECTION

PATENT NO. : 6,286,894 B1　　　　　　　　　　　　　　　　　　　Page 1 of 1
DATED　　　 : September 11, 2001
INVENTOR(S) : D. James Kingham It is certified that error appears in the above-identified patent and that said Letters Patent is hereby corrected as shown below:

Column 5,
Line 27, change "a portion of or the fill length of" to -- a portion of or the full length of --.

Column 13, claim 1,
Line 1, before "transportable", insert -- A --.

Signed and Sealed this

Second Day of April, 2002

*Attest:*

JAMES E. ROGAN
*Attesting Officer*　　　*Director of the United States Patent and Trademark Office*